United States Patent
Nakagawa

(10) Patent No.: US 9,996,400 B2
(45) Date of Patent: Jun. 12, 2018

(54) MULTI-CPU SYSTEM AND MULTI-CPU SYSTEM SCALING METHOD

(71) Applicant: Renesas Electronics Corporation, Tokyo (JP)

(72) Inventor: Tetsuya Nakagawa, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days. days.

(21) Appl. No.: 14/785,617

(22) PCT Filed: May 23, 2013

(86) PCT No.: PCT/JP2013/064370
§ 371 (c)(1),
(2) Date: Oct. 19, 2015

(87) PCT Pub. No.: WO2014/188561
PCT Pub. Date: Nov. 27, 2014

(65) Prior Publication Data
US 2016/0085596 A1  Mar. 24, 2016

(51) Int. Cl.
*G06F 9/455* (2018.01)
*G06F 9/50* (2006.01)

(52) U.S. Cl.
CPC ............ *G06F 9/5094* (2013.01); *Y02D 10/22* (2018.01)

(58) Field of Classification Search
None
See application file for complete search history.

(56) References Cited

U.S. PATENT DOCUMENTS 5,913,068 A  6/1999  Matoba
8,984,200 B2 *  3/2015  Davis ................. G06F 9/4812
                                              710/260
(Continued)

FOREIGN PATENT DOCUMENTS

JP    H06-59906 A    3/1994
JP    H 09-138716 A  5/1997
(Continued)

OTHER PUBLICATIONS

International Search Report (ISR) (PCT Form PCT/ISA/210), in PCT/JP2013/064370, dated Aug. 27, 2013.
(Continued)

*Primary Examiner* — Dong Kim
(74) *Attorney, Agent, or Firm* — McGinn IP Law Group, PLLC

(57) ABSTRACT

In an asymmetric multi-CPU system on which a plurality of type of CPUs with different data processing performance and power consumption are mounted in groups for each type, a plurality of forms of combination of the types and numbers of CPUs are defined in such a way that the maximum numbers of the overall data processing and power consumption very by stages. Then, the system performs a control of allocation of the data processing to the CPU identified by the form selected from the definition information according to the data processing environment, in order to reduce unnecessary power consumption according to the data processing environment, such as data processing load, and to easily achieve the required data processing performance.

23 Claims, 17 Drawing Sheets

(56) References Cited

U.S. PATENT DOCUMENTS

| | | | |
|---|---|---|---|
| 2008/0282012 A1* | 11/2008 | Ishimi | G06F 1/3293 |
| | | | 710/306 |
| 2012/0317321 A1 | 12/2012 | Chang | |
| 2013/0160016 A1* | 6/2013 | Gummaraju | G06F 9/5044 |
| | | | 718/102 |
| 2014/0129808 A1* | 5/2014 | Naveh | G06F 9/4856 |
| | | | 712/225 |
| 2014/0189239 A1* | 7/2014 | Hum | G06F 12/0831 |
| | | | 711/122 |
| 2014/0196050 A1* | 7/2014 | Yu | G06F 9/5088 |
| | | | 718/104 |
| 2014/0282504 A1* | 9/2014 | O'Donnell | G06F 9/45558 |
| | | | 718/1 |

FOREIGN PATENT DOCUMENTS

| | | |
|---|---|---|
| JP | 2004-280378 A | 10/2004 |
| JP | 2005-085164 A | 3/2005 |
| JP | 2010-231329 A | 10/2010 |
| JP | 2011-209846 A | 10/2011 |
| JP | 2012-256306 A | 12/2012 |
| WO | WO 2004/081775 A1 | 9/2004 |

OTHER PUBLICATIONS

Japanese Office Action in Application No. JP 2015-517999 dated Sep. 8, 2016 with an English translation thereof.
Japanese Office Action dated May 9, 2017 with an English translation thereof.

* cited by examiner

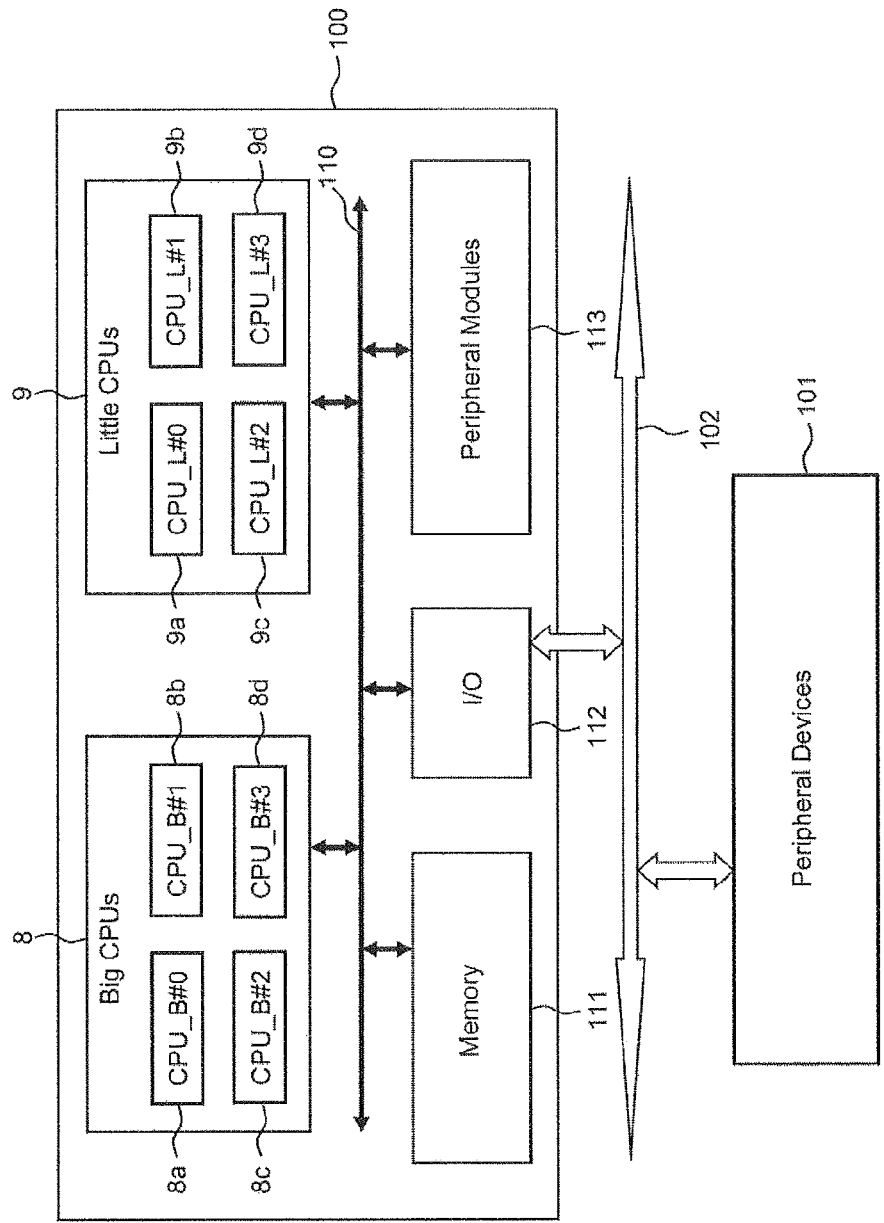

Fig.3

$$\begin{pmatrix} V_1 \\ V_2 \\ V_3 \\ V_4 \\ V_5 \\ V_6 \\ V_7 \\ V_8 \\ V_9 \\ V_{10} \\ V_{11} \\ V_{12} \end{pmatrix} \sim 10$$

=

$$\begin{pmatrix} 1 & 0 & 0 & 0 & 0 & 0 & 0 & 0 & 0 & 0 & 0 \\ 1 & 1 & 0 & 0 & 0 & 0 & 0 & 0 & 0 & 0 & 0 \\ 1 & 1 & 1 & 0 & 0 & 0 & 0 & 0 & 0 & 0 & 0 \\ 1 & 1 & 1 & 1 & 0 & 0 & 0 & 0 & 0 & 0 & 0 \\ 1 & 1 & 1 & 1 & 1 & 0 & 0 & 0 & 0 & 0 & 0 \\ 1 & 1 & 1 & 1 & 1 & 1 & 0 & 0 & 0 & 0 & 0 \\ 1 & 1 & 1 & 1 & 1 & 1 & 1 & 0 & 0 & 0 & 0 \\ 1 & 1 & 1 & 1 & 1 & 1 & 1 & 1 & 0 & 0 & 0 \\ 1 & 1 & 1 & 1 & 1 & 1 & 1 & 1 & 1 & 0 & 0 \\ 1 & 1 & 1 & 1 & 1 & 1 & 1 & 1 & 1 & 1 & 0 \\ 1 & 1 & 1 & 1 & 1 & 1 & 1 & 1 & 1 & 1 & 1 \end{pmatrix} \sim 11$$

×

$$(B_1 \; B_2 \; B_3 \; B_4 \; L_1 \; L_2 \; L_3 \; L_4) \sim 12$$

=

$$\begin{pmatrix} L_1 \\ L_2 + L_2 \\ L_1 + L_2 \\ L_1 + L_2 + L_3 \\ L_1 + L_2 + L_3 + L_4 \\ B_1 + L_1 + L_2 + L_3 \\ B_1 + B_2 + L_1 + L_2 \\ B_1 + B_2 + B_3 + L_1 \\ B_1 + B_2 + B_3 + B_4 \\ B_1 + B_2 + B_3 + B_4 + L_1 \\ B_1 + B_2 + B_3 + B_4 + L_1 + L_2 \\ B_1 + B_2 + B_3 + B_4 + L_1 + L_2 + L_3 \\ B_1 + B_2 + B_3 + B_4 + L_1 + L_2 + L_3 + L_4 \end{pmatrix} \sim 13$$

POSSIBLE COMBINATION

Fig.5A $$\begin{Bmatrix}V_1\\V_2\\V_3\\V_4\\V_5\\V_6\\V_7\\V_8\end{Bmatrix} = \begin{pmatrix}0&0&0&0&1&0&0&0\\0&0&0&0&1&1&0&0\\0&0&0&0&1&1&1&0\\0&0&0&0&1&1&1&1\\1&0&0&0&0&0&0&0\\1&1&0&0&0&0&0&0\\1&1&1&0&0&0&0&0\\1&1&1&1&0&0&0&0\end{pmatrix} \times \begin{Bmatrix}B_1\\B_2\\B_3\\B_4\\L_1\\L_2\\L_3\\L_4\end{Bmatrix} = \begin{Bmatrix}L_1\\L_1+L_2\\L_1+L_2+L_3\\L_1+L_2+L_3+L_4\\B_1\\B_1+B_2\\B_1+B_2+B_3\\B_1+B_2+B_3+B_4\end{Bmatrix}$$

10a    11a    12a    POSSIBLE COMBINATION    13a

Fig.5B $$\begin{Bmatrix}V_1\\V_2\\V_3\\V_4\\V_5\\V_6\\V_7\\V_8\end{Bmatrix} = \begin{pmatrix}0&0&0&0&1&0&0&0\\0&0&0&0&1&1&0&0\\0&0&0&0&1&1&1&0\\0&0&0&0&1&1&1&1\\1&0&0&0&0&1&1&0\\1&1&0&0&1&1&0&0\\1&1&1&0&1&0&0&0\\1&1&1&1&0&0&0&0\end{pmatrix} \times \begin{Bmatrix}B_1\\B_2\\B_3\\B_4\\L_1\\L_2\\L_3\\L_4\end{Bmatrix} = \begin{Bmatrix}L_1\\L_2+L_2\\L_1+L_2+L_3\\L_1+L_2+L_3+L_4\\B_1+L_1+L_2+L_3\\B_1+B_2+L_3+L_4\\B_1+B_2+B_3+L_4\\B_1+B_2+B_3+B_4\end{Bmatrix}$$

10b    11b    12b    POSSIBLE COMBINATION    13b

Fig. 8

| Temperature | Battery Level | CPU Load | Operation |
|---|---|---|---|
| >70 degree | - | - | Choose V1 |
| <70 degree | >50% | >70% | Vi → Vi+1 |
| | | 30% =< 70% | NOP |
| | | <30% | Vi → Vi-1 |
| | <50% | 30% =< | NOP |
| | | <30% | Vi → Vi-1 |

Fig.12

| Temperature | User Setting | Battery Level | Operation |
|---|---|---|---|
| >70 degree | - | - | 1 LittleCPU ON |
| <70 degree | Performance Oriented Mode | >50% | ALL CPU ON |
| | | <50% | 2 BigCPU OFF |
| | Power Saving Mode | >50% | 4 BigCPU OFF |
| | | <50% | 1 LittleCPU ON |

Fig.16

| TOTAL PERFORMANCE | PERFORMANCE BREAKDOWN | CPU SUBJECT TO DVFS | BigCPU VOLTAGE | LittleCPU VOLTAGE |
|---|---|---|---|---|
| 12 | 1(L) × 4 + 2(B) × 4 | NONE | 1 | 1 |
| 13 | 1(L) × 2 + 1.5(L) × 2 + 2(B) × 4 | L × 2 | 1 | 1.2 |
| 14 | 1.5(L) × 4 + 2(B) × 4 | L × 4 | 1 | 1.2 |
| 15 | 1.5(L) × 4 + 3(B) × 1 + 2(B) × 3 | L × 4 + B × 1 | 1.2 | 1.2 |
| 16 | 1.5(L) × 4 + 3(B) × 2 + 2(B) × 2 | L × 4 + B × 2 | 1.2 | 1.2 |
| 17 | 1.5(L) × 4 + 3(B) × 3 + 2(B) × 1 | L × 4 + B × 3 | 1.2 | 1.2 |
| 18 | 1.5(L) × 4 + 3(B) × 4 | L × 4 + B × 4 | 1.2 | 1.2 |

Fig.17

| Temperature | Battery Level | CPU Load | Operation |
|---|---|---|---|
| >70 degree | - | - | Choose V1 |
| <70 degree | >50% | >70% | $V_i \longrightarrow V_{i+1}$ |
| | | 30% =< 70% | CPUfreq scaling on Vi |
| | | <30% | $V_i \longrightarrow V_{i-1}$ |
| | <50% | 30% =< | CPUfreq scaling on Vi |
| | | <30% | $V_i \longrightarrow V_{i-1}$ |

MULTI-CPU SYSTEM AND MULTI-CPU SYSTEM SCALING METHOD

TECHNICAL FIELD

The present invention relates to an asymmetrical multi-CPU system as well as to a scaling method of the same, and the invention relates to a technology that is effective in extending the battery driving time with the application, for example, to portable information terminal devices.

BACKGROUND ART

As a technique for extending the battery driving time while ensuring high data processing performance, there is a technique described in Patent Document 1. In this technique, there is provided, in addition to a first CPU for performing the data processing, a second CPU in which the peak performance is lower than the first CPU and the power efficiency is high, to monitor the load by the second CPU. When the load is large, the process is performed by the first CPU, while when the load is small, the process is performed by the second CPU in place of the first CPU. In this way, it is designed to reduce the leakage power during the system operation according to the load state and temperature change.

Further, in Patent Document 2, there is described a technique in which a management part is provided for managing power consumption information necessary for executing a task by each processor in a multi-processor system. At the time of the selection of processors to perform the task, the power consumption information is used for selecting a processor with the maximum execution throughput per unit of power consumption, and allocating the task to the processor. In this way, it is possible to achieve a multi-processor system that can perform a greater amount of throughput with a limited amount of power in an environment, such as a mobile terminal, in which the amount of power that can be used is limited.

CITATION LIST

Patent Documents

Patent Document 1: Japanese Unexamined Patent Application Publication No. 2004-280378
Patent Document 2: Japanese Unexamined Patent Application Publication No. 2011-209846

DISCLOSURE OF THE INVENTION

Problems that the Invention is to Solve

The present inventors have studied the scaling of CPU processing in an asymmetric multi-CPU system in which processing is asymmetrically allocated to a plurality of CPUs. In other words, the allocation of CPUs to perform a task is made variable between CPU with high data processing performance and CPU with low power consumption. As a method of solving this problem, there is proposed a method of exclusively switching the group of CPUs to be used, between a group of CPUs with high data processing performance and a group of CPUs with lower power consumption, according to the system load. Further, there is also proposed a method of one-to-one mapping between CPUs included in the group of CPUs with high data processing performance and CPUs included in the group of CPUs with low power consumption, to exclusively switch the CPU to be used according to the system load, between the corresponding CPUs by using the DVFS process or other related processes. However, these proposals have a problem that the maximum number of CPUs that can be used for task processing is limited to half the number of all the CPUs belonging to the two CPU groups, resulting in poor operation efficiency in the CPU resources. Further, because the CPU with high data processing performance and the CPU with low data processing performance are exclusively switched, the performance that can be achieved is the sum of a plurality of CPUs selected from the high data processing performance group and a plurality of CPUs selected from the low data processing performance group, so that an intermediate data processing performance may not be achieved. In other words, it is difficult to control to properly meet the process performance that the asymmetric multi-CPU system requires at a certain moment. As a result, there is a risk of selecting a combination of CPUs that excessively meets the required processing performance. Thus, there is a concern that this selection may lead to unnecessary power consumption. However, in order to make the best possible use of all the CPUs by allocating only a task with high load to CPU with high data processing performance and by allocating only a task with low load to CPU with low power consumption, it is necessary to optimize the kernel of the OS, in particular, the task scheduler or task dispatcher for such a CPU system. However, achieving such an optimization is not easy. The techniques of Patent Documents 1 and 2 do not suggest a solution to this problem.

The foregoing and other objects and novel features of the present invention will become apparent from the following detailed description when read in connection with the accompanying drawings.

Means for Solving the Problems

A typical one of the inventions disclosed in the present application is explained in brief as follows.

That is, in an asymmetric multi-CPU system on which a plurality of types of CPUs with different data processing performance and power consumption are mounted in groups for each type, a plurality of forms of combination of the types and numbers of the CPUs are defined so that the maximum values of the overall data processing performance and power consumption have variations (the maximum values of the overall data processing performance and power consumption vary by stages). Then, the multi-CPU system controls the type and number of CPUs to be allocated to the data processing according to the form selected from the definition information according to the data processing environment.

Effects of the Invention

The effect obtained by a typical one of the inventions disclosed in the present application is described in brief as follows.

That is, it is possible to reduce unnecessary power consumption according to the data processing environment, such as the data processing load, and to easily select a combination of CPUs that meets the required data processing performance.

BRIEF DESCRIPTION OF THE DRAWINGS

FIG. 2 is a system block diagram showing a system configuration example of an asymmetric multi-CPU system;

FIG. 3 is a diagram showing an example of the forms of combination of CPUs (BigCPU) 8a to 8d and CPUs (LittleCPU) 9a to 9d;

FIG. 5A is a diagram showing an example of the forms of combination with respect to the types and numbers of CPUs in the case of FIG. 4A;

FIG. 5B is a diagram showing an example of a combination form with respect to the type and number of CPUs in the case of FIG. 4B;

FIG. 8 is a diagram showing a process example of how the governor determines whether switching of virtual processors is necessary and how to select the appropriate virtual processor according to the determination result;

FIG. 12 is a diagram showing an example of a table that defines standards used for determination when the number of unnecessary CPUs is reduced in steps 18-4 and 18-5;

FIG. 16 is a diagram showing an example of the content of the DVFS process of Step 25; and FIG. 17 is a diagram showing a variation in which scaling of the CPU synchronous clock frequency is performed in the range from the range of the processing performance of the selected virtual processor to the extent of not entering the range of the next processing performance.

DESCRIPTION OF EMBODIMENT

1 Summary of the Embodiments

Figure 1:
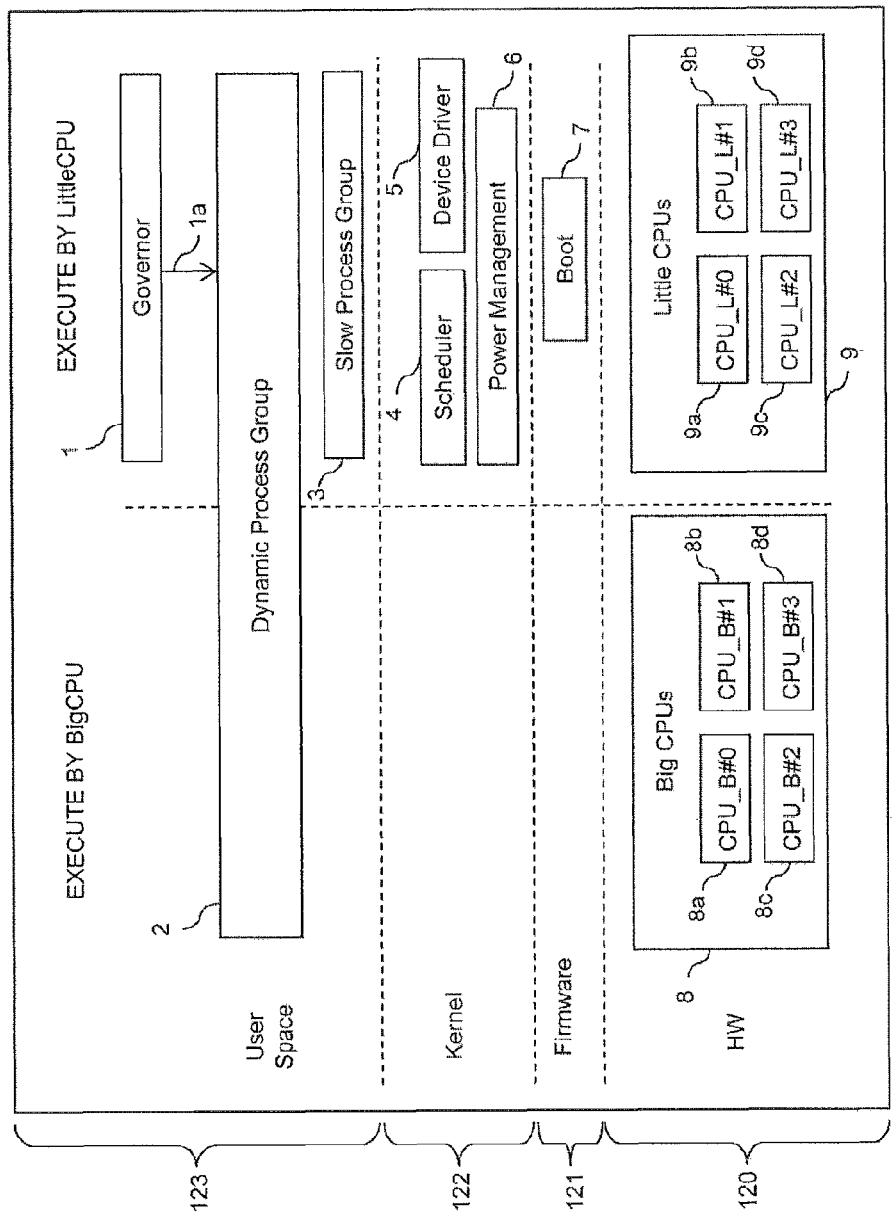
FIG. 1 is a diagram hierarchically showing an example of the configuration of the hardware and software of a processor.

First, a summary of representative embodiments of the invention disclosed in this application will be described. In the summary of representative embodiments, the reference numerals in parentheses in figures to be referred to just illustrate those included in the concept of the components with identical reference numerals.

[1] Forms of Combination of the Types and Numbers of CPUs in which the Data Processing Performance and Power Consumption Vary by Stages In an asymmetric multi-CPU system, on which a plurality of types of CPUs (8a to 8d, 9a to 9d) with different data processing performance and power consumption are mounted in groups for each type, the system has definition information (10, 13) that defines a plurality of forms of combination of the types and numbers of CPUs so that the maximum values of the overall data processing performance and power consumption have variations (the maximum values of the overall data processing performance and power consumption vary by stages), to allocate the data processing to the CPU identified by the form that is selected from the definition information according to the data processing environment (21).

According to this approach, it is possible to control the allocation of CPU to the data processing in such a way that only a task with high load is allocated to CPU with high data processing performance and only a task with low load is allocated to CPU with low power consumption, based on the definition information. Thus, the allocation process may not all depend on the task scheduler or task dispatcher of the OS, and optimization of the task scheduler or task dispatcher of the OS is not required for such a processing. Further, it is possible to maximally use all the CPUs, so that the operation efficiency of the CPU resources is also good. In addition, the performance that can be achieved by the allocation of data processing to CPUs is not limited to high data processing performance or low data processing performance, and intermediate data processing performance can also be achieved. Consequently, there will be little possibility of consuming unnecessary power. As a result, it is possible to reduce unnecessary power consumption according to the load of the data processing environment, and to easily achieve the required data processing performed.

[2] Forms of Combination in the Direction in which the Data Processing Performance and the Power Consumption are Increased by Stages In the first paragraph, a plurality of forms of combination of the types and numbers of CPUs are the forms of combination of the types and numbers of CPUs in the direction in which the data processing performance and the power consumption are increased by stages (10, 13).

According to this approach, it is possible to uniquely select the form of the minimum performance that meets the required processing performance.

[3] Forms of Combination in the Direction that Meets the Required Processing Performance by Stages In the first paragraph, a plurality of forms of combination of the types and numbers of CPUs included in the definition information are the forms of combination of the types and numbers of CPUs in the direction that meets the required processing performance by stages according to the data processing environment (10, 13). The system selects the form of the minimum performance that meets the required processing performance.

According to this approach, it is possible to uniquely select the form of the minimum performance that meets the required processing performance.

[4] Data Processing Load, Heat Generation State, Remaining Battery Level, and User Setting In the second or third paragraph, the data processing environment includes: a first environment that is understood by the magnitude of the data processing load (1$b$); a second environment that is understood by the magnitude of the data processing load (1$b$) and the heat generation state (1$c$); a third environment that is understood by the magnitude of the data processing load (1$b$), the heat generation state (1$c$), and the remaining battery level (1$d$); or a fourth environment that is understood by the user setting (1$e$, 1$f$), the magnitude of the data processing load (1$b$), the heat generation state (1$c$), and the remaining battery level (1$d$).

According to this approach, it is possible to understand the data processing environment in terms of the tolerance to the data processing capability from the first environment. From the second environment, it is possible to understand the data processing environment in terms of the tolerance to the data processing capability in which the heat generation state is taken into account. From the third environment, it is possible to understand the data processing environment in terms of the tolerance to the data processing capability in which the heat generation state and the power supply limit are taken into account. From the fourth environment, it is possible to understand the data processing environment in terms of the tolerance to the data processing capability in which the heat generation state and the power supply limit are taken into account. In this case, it is also possible to reflect the user setting on the data processing environment.

[5] Heat Generation State of the CPU According to the Data Processing Performance and Power Consumption In the fourth paragraph, the heat generation state is the heat generation state of the CPU included in the group of CPUs with relatively large data processing performance and power consumption.

According to this approach, it is possible to understand the heat generation state affecting the data processing capability. Of course, this can also be achieved by monitoring the heat generation state of the CPU with small data processing performance and power consumption.

[6] Type of Large Data Processing Performance and Power Consumption and Type of Small Ones In the first paragraph, the CPU type corresponds to a plurality of groups of CPUs that are classified according to the magnitude of the data processing performance and power consumption of the CPU. For example, the CPU type corresponds to a CPU group (8) with large data processing performance and power consumption, as well as a CPU group (9) with small data processing performance and power consumption.

According to this approach, the grouping into two groups allows the CPU allocation to be changed for each definition of the form, without making the control being too complicated. It is needless to say that the CPUs can be grouped into three or more groups.

[7] Number of Combination Forms Greater than the Number of Mounted CPUs

In the first paragraph, the number of forms of combination of the types and numbers of the CPUs is greater than the number of mounted CPUs.

According to this approach, the stage can be segmented with respect to the forms of combination of the types and numbers of CPUs, which can contribute to an increase in the accuracy of gradual control of power consumption and data processing performance. It is needless to say that the number of combination forms can be equal to or less than the number of mounted CPUs.

[8] Notification to the Kernel by Control Program of the User Space

In the first paragraph, the control of the type and number of CPUs to be allocated to the data processing is a process of notifying the kernel of the type and number of CPUs that can be used for the data processing by a control program (1) of the user space.

According to this approach, it is possible to easily control the CPU allocation based on the definition information.

[9] Kernel Function Called Control Group

In the eighth paragraph, the process of notifying by the control program is achieved by a kernel function that controls the scheduler of the kernel from the user space.

According to this approach, it is possible to effectively divert the existing function of the kernel. It is needless to say that the notification process by the control program can also be achieved in the kernel space.

[10] CPU that Executes the Control Program

In the ninth paragraph, the CPU that executes the control program is a certain CPU of the CPU group (9) with relatively small data processing performance and power consumption.

According to this approach, the use of the CPU of the group of CPUs with relatively small data processing performance and power consumption for the data processing, which does not require high level processing, is excellent in the compatibility with the system designed to reduce the power consumption.

[11] Initial Allocation Setting of the Type and Number of CPUs to be Allocated to the Data Processing In the third paragraph, upon the boot process, the certain CPU selects one of the forms from the definition information according to at least the user setting (1$f$) as the data processing environment, thus activating a CPU to be used for the data processing according to the selected form and inactivating an unused CPU (18-5).

According to this approach, in the system boot, the operation of the CPU that is not initially used is inactivated by the user setting. In this way, it is possible to reduce unnecessary power consumption from the beginning. If the unused CPU is not inactivated in the system boot, the particular CPU will go into a stand-by mode with the power supplied, so that when compared to this case, lower power consumption can be achieved.

[12] Update of the Allocation

In the eleventh paragraph, the allocation of the type and number of CPUs to be used for the data processing is updated. In this case, when an inactive CPU is allocated to the use target, the particular CPU is activated, and when an active CPU is excluded from the use target, the particular CPU is inactivated (21-2).

According to this approach, it is possible to reduce unnecessary power consumption caused by the unused CPU also when the CPU allocation is updated.

[13] Gradual Update and Skip Update in the Update of the Allocation of the Form

In the eleventh paragraph, the update of the allocation of the type and number of CPUs to be allocated to the data processing is done by gradual update to gradually update the form to be selected step by step (21) or by skip update to update the form to be selected at once by skipping multiple stages (21$b$). When the change in the data processing environment is within a predetermined range, the gradual update is used. When the change in the data processing environment is beyond the predetermined range, the skip update is used.

In this way, it is possible to obtain a good following of the data processing to a rapid load change or the like. This is because, for example, when the CPU starts the execution of the task after the stand-by period, it may be difficult to immediately obtain a high data processing performance by the gradual update.

[14] Clock Supply Stop or/and Power Supply Stop

In the eleventh paragraph, the inactivation of a CPU is the synchronous clock supply stop or/and power supply stop to the particular CPU (21-2), and the activation is the synchronous clock supply start or/and power supply start to the particular CPU.

According to this approach, it is possible to easily perform the process of the activation and inactivation of the CPU.

[15] Extension of the Maximum Performance by DVFS

In the first paragraph, when there is a performance request beyond the maximum performance that is defined in the definition information as the data processing environment, the DVFS (Dynamic Voltage/Frequency Scaling) process (25) is performed to raise either or both of the power supply voltage of a certain CPU and the synchronous clock frequency thereof, according to the level of the request.

In this way, it is possible to easily respond to the performance request beyond the maximum performance that is defined in the definition information. In particular, when it is assumed that the DVFS process is performed only for the performance request beyond the maximum performance, it is possible to simplify the CPU allocation control according to the form defined in the definition information.

[16] DVFS Definition Information that Defines the Control Form by the DVFS Process In the fifteenth paragraph, the system has DVFS definition information (FIG. 16) that defines a CPU subject to the DVFS process, as well as the degree of rise of the power supply voltage and synchronous clock frequency for the particular CPU, according to the level of the performance request, to perform the DVFS process by referring to the particular definition information.

According to this approach, it is possible to easily perform the scale control of the power supply voltage and the synchronous clock frequency in response to the performance request beyond the maximum performance.

[17] Forms of Combination of the Types and Numbers of CPUs in which the Data Processing Performance and the Power Consumption Vary by Stages.

In an asymmetric multi-CPU system on which a plurality of types of CPUs (8a to 8d, 9a to 9d) with different data processing performance and power consumption are mounted in groups for each type, a multi-CPU system scaling method for scaling the combination of the type and number of CPUs to be used according to the data processing environment, includes the following processes:

(a) a determination process (19) for determining the data processing environment;

(b) a selection process (21) for selecting one form from the definition information (10, 13) that defines a plurality of forms of combination of the types and numbers of CPUs in such a way that the maximum values of the overall data processing performance and power consumption vary by stages; and (c) a control process (21) for allocating the data processing to the CPU identified by the selected form.

According to this approach, the allocation of the CPU to the data processing can be performed according to the result of the determination process with respect to the definition information. Thus, the control for allocating only a task with high load to CPU with high data processing performance and for allocating only a task with low load to CPU with low power consumption may not all depend on the task scheduler or task dispatcher of the OS. Thus, there is no need to optimize the task scheduler or task dispatcher of the OS for such a processing. Further, it is possible to maximally use all the CPUs, so that the operation efficiency of the CPU resources is also good. In addition, the performance that can be achieved by the allocation of data processing to CPU is not limited to high data processing performance or low data processing performance, and intermediate data processing performance can also be achieved. Consequently, there will be little possibility of consuming unnecessary power. As a result, by using this method, it is possible to reduce unnecessary power consumption according to the load of the data processing environment such as the data processing load, and to easily achieve the required data processing performance.

[18] Combination Form Provided in the Direction in which the Data Processing Performance and the Power Consumption are Increased by Stages In the seventeenth paragraph, a plurality of forms of combination of the types and numbers of CPUs included in the definition information are the forms of combination of the types and numbers of CPUs in the direction in which the data processing performance and the power consumption are increased by stages (10, 13).

According to this approach, it is possible to uniquely select the form of the minimum performance that meets the required processing performance.

[19] Combination Form Provided in the Direction that Meets the Required Processing Performance by Stages In the seventeenth paragraph, a plurality of forms of combination of the types and numbers of CPUs included in the definition information are the forms of combination of the types and numbers of CPUs in the direction that meets the required processing performance by stages according to the environment of the data processing (10, 13). The system selects the form of the minimum performance that meets the required processing performance.

According to this approach, it is possible to uniquely select the form of the minimum performance that meets the required processing performance.

[20] Data Processing Load, Heat Generation State, Remaining Battery Level, and User Setting In the eighteenth or nineteenth paragraph, there is provided a multi-CPU system scaling method in which the data processing environment includes the following environments: a first environment that is understood by the magnitude of the data processing load (1b); a second environment that is understood by the magnitude of the data processing load and the heat generation state (1c); a third environment that is understood by the magnitude of the data processing load, the heat generation state, and the remaining battery level (1d); or a fourth environment that is understood by the user setting (1e, 1f), the magnitude of the data processing load, the heat generation state, and the remaining battery level.

According to this approach, it is possible to understand the environment of the data processing in terms of the tolerance to the data processing capability from the first environment. From the second environment, it is possible to understand the environment of the data processing in terms of the tolerance to the data processing capability in which the heat generation state is taken into account. From the third environment, it is possible to understand the environment of the data processing in terms of the tolerance to the data processing capability in which the heat generation state and the power supply limit are taken into account. From the fourth environment, it is possible to understand the environment of the data processing in terms of the tolerance to the data processing capability in which the heat generation state and the power supply limit are taken into account. In this case, it is also possible to reflect the user setting on the data processing environment.

[21] CPU Heat Generation State According to the Data Processing Performance and Power Consumption In the twentieth paragraph, the heat generation state is the heat generation state of the CPU included in the group of CPUs with relatively large data processing performance and power consumption.

According to this approach, it is possible to understand the heat generation state that affects the data processing capability. Of course, it is also possible to monitor the heat generation state of the CPU included in the group of CPUs with relatively small data processing performance and power consumption.

[22] Type of Large Data Processing Performance and Power Consumption and Type of Small Ones In the seventeenth paragraph, the CPU type corresponds to a plurality of groups of CPUs that are classified according to the magnitude of the data processing performance and power consumption of the CPU. For example, the CPU type corresponds to the CPU group (8) with large data processing performance and power consumption, as well as the CPU group (9) with small data processing performance and power consumption.

According to this approach, the grouping into two groups allows the CPU allocation to be changed for each definition of the form, without making the control being too complicated. It is needless to say that the CPUs can be grouped into three or more groups.

[23] Number of Combination Forms Greater than the Number of Mounted CPUs

In the seventeenth paragraph, the number of forms of combination of the types and numbers of the CPUs is preferably greater, for example, than the number of mounted CPUs.

According to this approach, the stage can be segmented with respect to the forms of combination of the types and numbers of CPUs, which can contribute to a gradual increase in the control accuracy of the power consumption and data processing performance.

It is needless to say that the number of combination forms can be equal to or less than the number of mounted CPUs.

[24] Notification to the Kernel by Control Program of the User Space

In the seventeenth paragraph, the control of the type and number of CPUs to be allocated to data processing is a process of notifying the kernel of the type and number of CPUs that can be used for the data processing by the control program (1) of the user space.

According to this approach, it is possible to easily bridge between the form referred to in the definition information and the CPU allocation control.

[25] Kernel Function Called Control Group

In the seventeenth paragraph, the process of notification by the control program is achieved by a kernel function that controls the scheduler of the kernel from the user space.

According to this approach, it is possible to effectively divert the existing function of the kernel.

[26] CPU that Executes the Control Program

In the twenty-fifth paragraph, the CPU that executes the control program is a certain CPU of the CPU group (9) with relatively small data processing performance and power consumption.

According to this approach, the use of the CPU of the CPU group with relatively small data processing performance and power consumption for the data processing, which does not require high level processing, is excellent in the compatibility with the system designed to reduce the power consumption.

[27] Initial Allocation Setting of the Type and Number of CPUs to be Allocated to the Data Processing In the twenty-sixth paragraph, upon the boot process, the certain CPU selects one of the forms from the definition information according to at least the user setting (1f) as the data processing environment, thus activating a CPU to be used for the data processing according to the selected form and inactivating an unused CPU (18-5).

According to this approach, in the system boot, the operation of the CPU that is not initially used is inactivated by the user setting. In this way, it is possible to reduce unnecessary power consumption from the beginning. If the unused CPU is not inactivated, the particular CPU will go into a stand-by mode with the power supplied, so that when compared to this case, lower power consumption can be achieved.

[28] Update of the Allocation

In the twenty-seventh paragraph, the allocation of the type and number of CPUs to be used for the data processing is updated. In this case, when an inactive CPU is allocated to the use target, the particular CPU is activated, and when an active CPU is excluded from the use target, the particular CPU is inactivated (21-2).

According to this approach, it is possible to reduce unnecessary power consumption caused by the used CPU also when the CPU allocation is updated.

[29] Gradual Update and Skip Update in the Update of the Allocation of the Form

In the twenty-seventh paragraph, the update of the allocation of the type and number of CPUs to be allocated to the data processing is done by gradual update to gradually update the form to be selected step by step (21) or by skip update to update the form to be selected at once by skipping multiple stages (21b). When the change in the data processing environment is within a predetermined range, the gradual update is used. When the change in the data processing environment is beyond the predetermined range, the skip update is used.

According to this approach, it is possible to obtain a good following of the data processing to a rapid load change or the like. This is because, for example, when the CPU starts the execution of the task after the stand-by period, it may be difficult to immediately obtain a high data processing performance by the gradual update.

[30] Clock Supply Stop or/and Power Supply Stop

In the twenty-seventh paragraph, the inactivation of a CPU is the synchronous clock supply stop or/and power supply stop to the particular CPU (21-2), and the activation is the synchronous clock supply start or/and power supply start to the particular CPU.

According to this approach, it is possible to easily perform the process of the activation and inactivation of the CPU.

[31] Extension of the Maximum Performance by DVFS

In the seventeenth paragraph, when there is a performance request beyond the maximum performance that is defined in the definition information as the data processing environment, the DVFS (Dynamic Voltage/Frequency Scaling) process (25) is performed to raise either or both of the power supply voltage of a certain CPU and the synchronous clock frequency thereof, according to the level of the request.

In this way, it is possible to easily respond to the performance request beyond the maximum performance that is defined in the definition information. In particular, when it is assumed that the DVFS process is performed only for the performance request beyond the maximum performance, it is possible to simplify the CPU allocation control according to the form defined in the definition information.

[32] DVFS Definition Information that Defines the Control Form by the DVFS Process In the thirty-first paragraph, the system has DVFS definition information (FIG. 16) that defines a CPU subject to the DVFS process, as well as the degree of rise of the power supply voltage and synchronous clock frequency for the particular CPU, according to the level of the performance request, to perform the DVFS process by referring to the particular definition information.

According to this approach, it is possible to easily perform the scale control of the power supply voltage and the synchronous clock frequency in response to the performance request beyond the maximum performance.

2. Further Detailed Description of the Embodiments

The embodiments are described in further detail. Note that in all drawings for explaining the embodiments of the present invention, the same reference numerals are given to those with the same functions, and repeated explanation thereof will be omitted.

Multi-CPU System

FIG. 2 shows a system configuration example of an asymmetric multi-CPU system. Although not particularly limited thereto, it is shown a system configuration in which a processor 100 and peripheral devices 101 are connected through a bus (or a network) 102. The processor 100 can be configured by a single chip or can be configured by multiple chips. The peripheral devices 101 can be configured by various devices and equipment. For example, when assuming a portable information communication terminal device as a multi-CPU system, the processor 100 performs communication protocol processing and application processing, and the peripheral devices 101 include a liquid crystal display, a touch panel, a battery, and the like.

Here, the processor 100 is configured as an asymmetric multi-processor on which a plurality of types of CUPs with different data processing performance and power consumption are mounted in groups for each type. The processor 100 includes, as a plurality of types of CPUs (central processing units), a first group (BigCPUs) 8 of CPUs with high data processing performance and high power consumption, and a second group (LittleCPUs) 9 of CPUs with low power consumption and low data processing performance. Although not particularly limited thereto, the CPUs (BigCPU) of the first group 8 are four CPUs (CPU_B#0 to CPU_B#3) indicated by reference numerals 8a to 8d. Further, although not particularly limited thereto, the CPUs (LittleCPU) of the second group 9 are four CPUs (CPU_L#0 to CPU_L#3) indicated by reference numerals 9a to 9d. The respective CPUs 8a to 8d of the first group 8 and the respective CPUs 9a to 9d of the second group 9 have the same architecture. For example, when the configuration of the cache memory is different in the CPUs 9a to 9d of the second group 9 with respect to the CPUs 8a to 8d of the first group 8, it is virtually achieved to have the same architecture by software emulation. The CPUs 8a to 8d of the first group 8 as well as the CPUs 9a to 9d of the second group 9 are connected to a memory 111, an input/output interface circuit 112, and peripheral modules 113 through a bus 110. Although not particularly shown, the peripheral modules 113 include an interrupt controller, a DMA (Direct Memory Access) controller, a communication controller, and the like. The input/output interface circuit 112 is connected to the peripheral devices 101.

Configuration of the Hardware and Software of the Processor

FIG. 1 shows an example of the configuration of the hardware and software of the processor 100 in a hierarchical fashion. Here, it is configured with four layers of a hardware layer (HW) 120, a firmware layer (Firmware) 121, a kernel layer (Kernel) 122, and a user space layer (Userspace) 123.

The number of CPUs of the first group (BigCPU) 8 and the number of CPUs of the second group (LittleCPU) 9 may be arbitrary. Here, to simplify the explanation, it is assumed that, as described above, the system includes the four CPUs (BigCPU) 8a to 8d in which high performance is prioritized and the power consumption is also large, as well as the four CPUs (Little CPU) 9a to 9d with moderate performance and power consumption reduced.

The firmware layer (Firmware) 12 is a lower software group such as a boot code (Boot) 7 and is stored, for example, in ROM of the memory 111.

The kernel layer (Kernel) 122 is the operating system (OS) such as Linux (registered trademark). FIG. 1 shows functions of a scheduler (Scheduler) 4, a device driver (Device Driver) 5, and a power management (Power Management) 6, which are typical components. The scheduler (Scheduler) 4 is the function used for task management, performing a scheduling or dispatch to allocate the process configuring the data processing to a CPU that can be operated according to the priority or the like. The device driver (Device Driver) 5 performs device management to input and output information to and from a hardware device such as a video card or a LAN card. The power management 6 performs power supply management such as suspend/resume, to perform dynamic control (DVFS) of the power supply voltage and frequency according to the system load and temperature.

The application software of the user is executed in the user layer (Userspace) 123. In FIG. 1, the application software is classified into two groups. One is a slow process group (Slow Process Group) 3 in which the required processing performance is kept low. The other is a dynamic process group (Dynamic Process Group) 2 in which the required processing performance varies between high and low levels according to the state. Further, in FIG. 1, the software located on the left side is executed by the CPUs (BigCPU) 8a to 8d, and the software located on the right side is executed by the CPUs (LittleCPU) 9a to 9d. The slow process group 3 is located on the right side because it is executed by the CPUs (LittleCPU) 9a to 9d. The dynamic process group 4 is located on both the left and right sides in FIG. 1 because it is executed by the CPUs (BigCPU) 8a to 8d and the CPUs (LittleCPU) 9a to 9d according to the required processing performance. The combination of the CPUs (BigCPU) 8a to 8d and the CPUs (LittleCPU) 9a to 9d, which execute the dynamic process group 4, is switched by a governor (Governor) 1 according to the required processing performance with a control signal 1a. The switching is done by the governor 1 operating the scheduler 4 of the kernel 122. This operation is performed by using the kernel function (the control program that the kernel supports) called control group (C group) that the Linux (registered trademark) OS supports. For example, the governor (Governor) 1 can divert the control program that the Android (registered trademark) OS supports. It is needless to say that the governor (Governor) 1 can be within the kernel.

Next, the mechanism of switching the combination of CPUs will be described.

Typical Example of the Mechanism of Switching the Combination of CPUs

FIG. 3 shows an example of the combination form of the CPUs (BigCPU) 8a to 8d and the CPUs (LittleCPU) 9a to 9d. In the figure, the CPUs (BigCPU) 8a to 8d are shown as B1 to B4, and the CPUs (LittleCPU) 9a to 9d are shown as L1 to L4. Here, it is introduced the concept of virtual processor Vi (i=1 to 12) that indicates a group of combination of the CPUs (BigCPU) 8a to 8d and the CPUs (LittleCPU) 9a to 9d. The determinant of FIG. 3 maps a vector 12, which is configured with the four CPUs (BigCPU) 8a to 8d and the four CPUs (LittleCPU) 9a to 9d, to 12 virtual processors Vi (i=1 to 12). The mapping state is shown as "Possible Combination" indicated by reference numeral 13. In FIG. 3, given the performance of each of the CPUs (LittleCPU) 9a to 9d as a unit (1), the performance of the respective CPUs (BigCPU) 8a to 8d is set to twice the unit, and the power consumption of the respective CPUs (BigCPU) 8a to 8d is also set to twice the unit. Thus, the suffix i of the virtual processor Vi shows performance. A matrix 11 is a conversion matrix for mapping the four CPUs (BigCPU) 8a to 8d and the four CPUs (LittleCPU) 9a to 9d, to the twelve virtual processors Vi (i=1 to 12), according to the combination shown as 13.

The form of the twelve virtual processors Vi (i=1 to 12) and the combination shown as 13 has the nature as the definition information that defines a plurality of forms of combination of the CPUs 8a to 8d and 9a to 9d in such a way that the maximum values of the overall data processing performance and power consumption vary by stages. In other words, the form of the twelve virtual processors Vi (i=1 to 12) and the combination shown as 13 is the form of combining the type and number of CPUs in the direction in which the data processing performance and the power consumption are increased by stages. Further, when viewed from a different perspective, this is the form of combining the type and number of CPUs in the direction that meets the required processing performance by stages according to the data processing environment such as the processing load, which is a mapping of a plurality of combination forms that allows to specify the form of the minimum performance meeting the required processing performance.

Figure 4A:
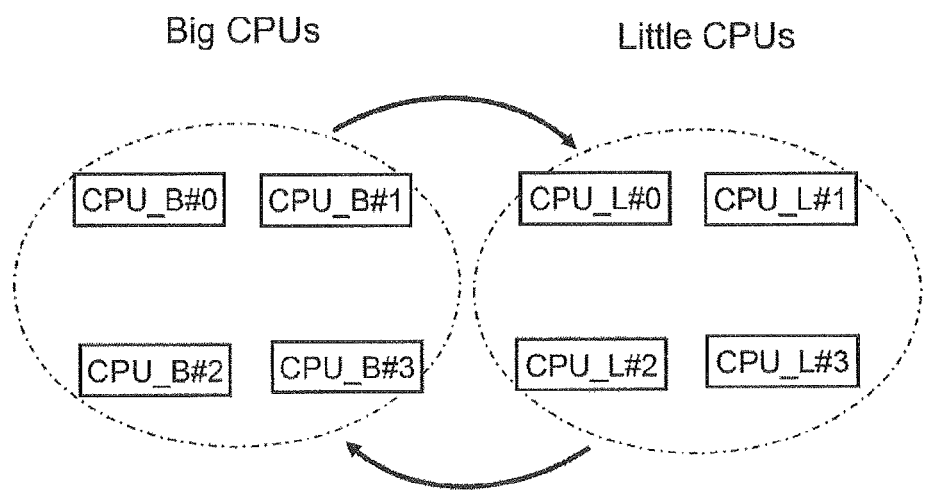
FIG. 4A is a diagram showing an example of a method for exclusively switching the group of CPUs to be used according to the system load or other factors, as a comparative example.
Figure 4B:
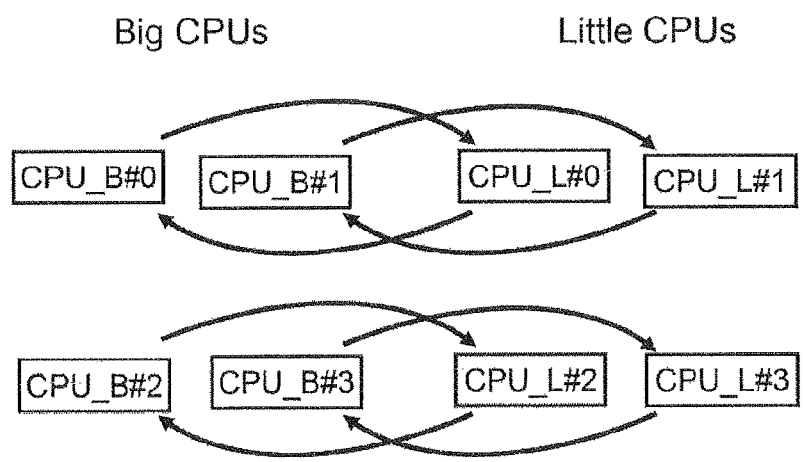
FIG. 4B is a diagram showing an example of a method for one-to-one mapping a plurality of CPUs included in the group of CPUs with high data processing performance and a plurality of CPUs included in the group of CPUs with low power consumption, to exclusively switch the CPU to be used according to the system load between the corresponding CPUs, as a comparative example.

FIGS. 4A and 4B show comparative examples of the combination of the CPUs. FIG. 4A shows a method of exclusively switching between the groups 8 and 9 of the CPUs to be used. FIG. 4B shows a method of mapping one-to-one between the CPUs 8a to 8d included in the group 8 of CPUs with high data processing performance, and the CPUs 9a to 9d included in the group 9 of CPUs with low power consumption, to exclusively switch the CPU to be used, between the corresponding CPUs, according to the system load. In this case also, similar to FIG. 3, when the relationship between the processing performance and the power consumption with respect to the CPUs 9a to 9d and 8a to 8d is 1:2, the combination of the type and number of CPUs in the case of FIG. 4A and FIG. 4B is as shown in FIG. 5A and FIG. 5B.

In the case of FIG. 4A and FIG. 4B, maximally only four CPUs can be selected, and as is clear from the example of "Possible Combination" of 13a, it is difficult to achieve V9 to V12 with the performance value 9 or more. When a performance of V9 or more is required, this requirement can be met by increasing the frequency of the CPU, but at the same time it is necessary to increase the power supply voltage. Because the power consumption is proportional to one power of the frequency and is proportional to the square of the voltage, this approach will also lead to unnecessary power consumption.

Figure 6:
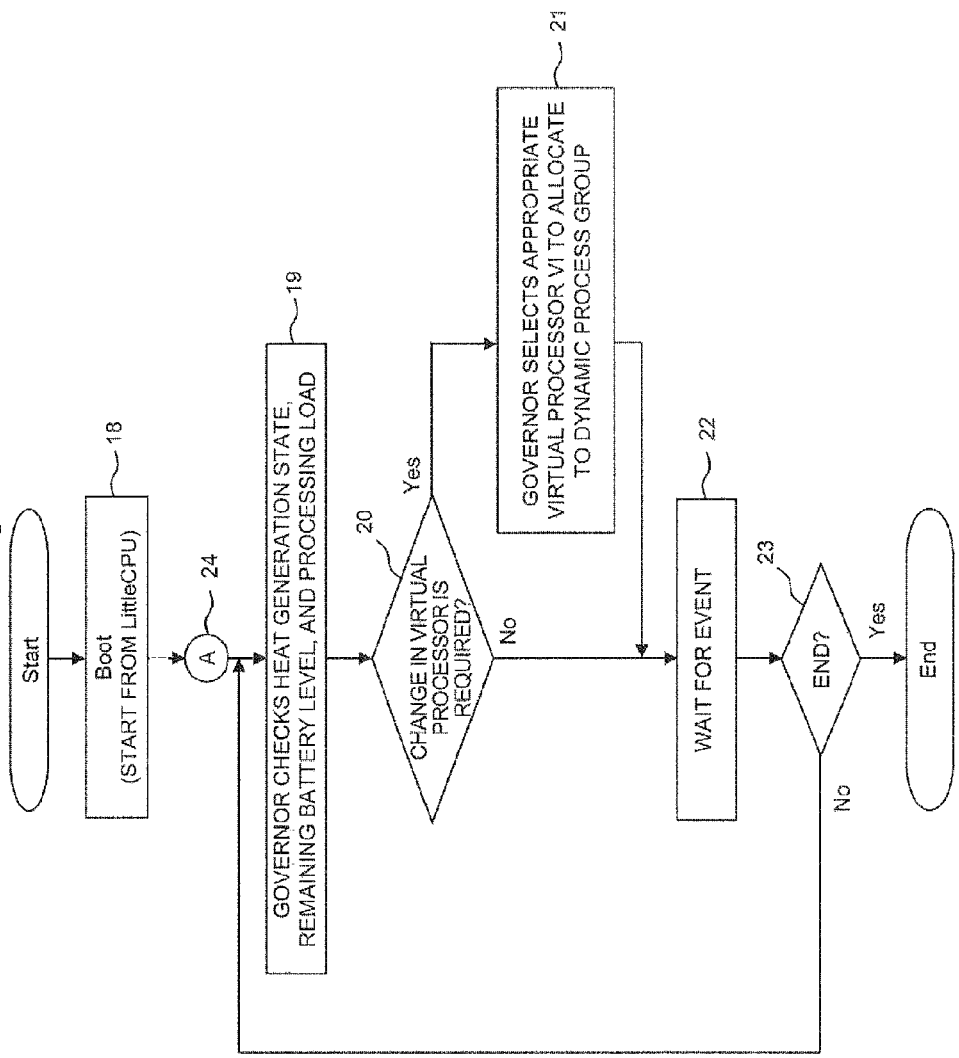
FIG. 6 is a flow chart showing an example of a control flow of the process of virtual processor allocation.

FIG. 6 shows a control flowchart of the allocation process of the virtual processors. First, a boot code 7 is executed by a certain CPU which is one of the CPUs (LittleCPU) 9a to 9d with the power consumption reduced. Then, the OS kernel (including the codes of the scheduler 4, device driver 5, and power management 6) 122 is started by the certain CPU that has executed the boot code 7. Although not particularly limited thereto, in FIG. 6, the process of Step 18 also includes the process of executing the program included in the slow process group 3 in the user space 123 afterward.

In Step 19, the governor (Governor) 1 checks the heat generation state (Temperature) 1c, the remaining battery level (Battery Level) 1d, and the processing load (CPU Load) 1b which is the load of the data processing, in this order as the data processing environments. Then, the system determines whether it is necessary to switch the virtual processor Vi according to the check result (Step 20). When it is determined that a change is necessary, the system selects the appropriate virtual processor Vi and allocates it to the dynamic processor group 2 (Step 21).

Figure 7:
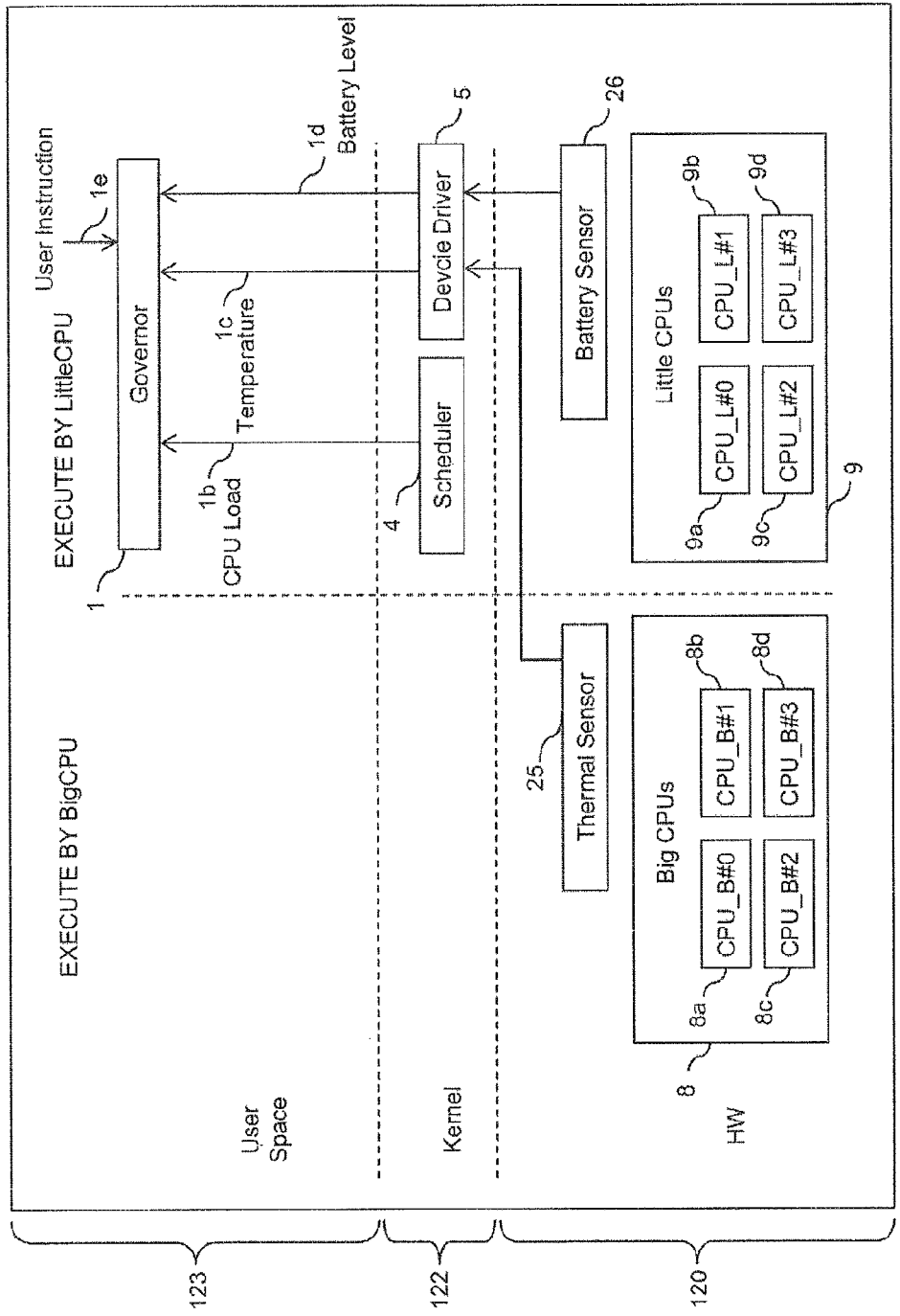
FIG. 7 is a diagram showing an example of how a governor obtains the information of the heat generation state, the remaining battery level, and the processing load.

FIG. 7 shows an example of how the governor 1 inputs the information of the heat generation state 1c, the remaining battery level 1d, and the processing load 1b. The heat generation state 1c and the remaining battery level 1d are obtained from a thermal sensor (Thermal Sensor) 25 and a battery sensor (Battery Sensor) 26 in the hardware layer 120, respectively, through the device driver (Device Driver) 5. The processing load (CPU Load) 1b is obtained from the scheduler 4 of the kernel layer 122. The processing load 1b is understood, for example, by the CPU occupancy. Note that FIG. 7 omits illustration of the firmware layer 121.

A process example of how the governor (Governor) 1 determines whether it is necessary to switch the virtual processor Vi and how to select the appropriate virtual processor Vi according to the result of the determination will be described with reference to FIG. 8. FIG. 8 shows the operation (Operation) of selecting the appropriate virtual processor Vi according to the three inputs described above: the heat generation state (Temperature) 1c; the remaining battery level (Battery Level) 1d; and the processing load (CPU Load) 1b. It goes without saying that the specific numerical values, such as thresholds, as well as Operation (Choose V1, or the like) in FIG. 8 are only an example to explain the mechanism and can be changed according to the actual system. In the example of FIG. 8, when the temperature is greater than 70 degrees Celsius, the system determines to be an abnormal situation and selects V1 with the lowest current consumption, regardless of the remaining battery level and the processing load.

FIG. 8 shows an example of the condition in the determination of whether or not it is necessary to change the virtual processor in Step 20. When Operation is NOP in FIG. 8, there are two conditions as follows: One is when the temperature is less than 70 degrees Celsius, the remaining battery level is more than 50%, and the processing load is 30% or more and 70% or less. The other is when the remaining battery level is less than 50% and the processing load is 30% or more. It can be found that the conditions to select the appropriate virtual processor Vi in Step 21 of FIG.

6 are the remaining three conditions other than the conditions in FIG. 8 described above. In other words, when the temperature is less than 70 degrees Celsius, the remaining battery level is more than 50%, and the processing load is greater than 70%, the system allocates the virtual processor with the next higher threshold (from Vi to Vi+1). On the other hand, when the processing load is smaller than 30%, the system moves to the virtual processor with the next lower threshold (from Vi to Vi−1). When the remaining battery level is less than 50%, and when the processing load is smaller than 30%, the system moves to the virtual processor with the next lower threshold (from Vi to Vi−1). However, in the example of FIG. 8, it goes without saying that when the system may not move to the next higher or lower state from the current one because V12 with the maximum processing performance and V1 with the minimum processing performance have been already allocated, the system remains in the current state.

After allocating the virtual processor Vi to the dynamic process group in Step 21 of FIG. 6, the system waits for an event (Step 22). During the event waiting period, the process of the dynamic process group 2 of FIG. 1 is executed by the virtual processor Vi that is allocated in Step 21. The event the system waits for in Step 22 is an event of requiring the virtual processor allocation process again, which is, for example, a timer interrupt started at certain time intervals, a heat sensor interrupt when the temperature rises above a predetermined threshold, or the like. The checking and handling of the heat generation state described here is an example and not an essential condition. The process from Step 19 to Step 22 is repeatedly performed until the completion of the series of program processes is determined in Step 23.

It is assumed that the governor (Governor) 1 of FIG. 1, which controls the allocation process of the virtual processor Vi, is operated by one CPU included, for example, in the CPUs (Little CPU) 9a to 9d. In the figure, the governor 1 is located in the user space layer 123 but may be located in the kernel layer 122. Those requiring high performance processing in the software of the user space layer 123 are put in the dynamic process group 2 in which the virtual processor Vi can be switched dynamically. As described above, the CPU allocation to the data processing of the dynamic process group 2, namely, the allocation of the virtual processor Vi can be performed according to the definition information of FIG. 3 based on the rules shown in FIG. 8. In short, the setting of CPU used for the data processing is done according to the remaining battery level, the heat generation state in the processor, or the load of the program to be executed, to achieve the appropriate combination of the CPUs (Big CPU) 8a to 8d and the CPUs (Little CPU) 9a to 9d. Thus, the control of allocating only a task with high load to CPU with high data processing performance and allocating only a task with low load to CPU with low power consumption may not all depend on the scheduler 4 (or task dispatcher) of the OS. For this reason, there is no need to optimize the task scheduler (or task dispatcher) of the OS for such a processing. Further, it is possible to maximally use all the CPUs, so that the operation efficiency of the CPU resources is also good. In addition, the performance that can be achieved by the allocation of data processing to CPU is not limited to high data processing performance or low data processing performance, and intermediate data processing performance can also be achieved. Thus, there will be little possibility of consuming unnecessary power. As a result, it is possible to reduce unnecessary power consumption according to the data processing environment such as the data processing load, and to easily achieve the required data processing performance.

Figure 9:
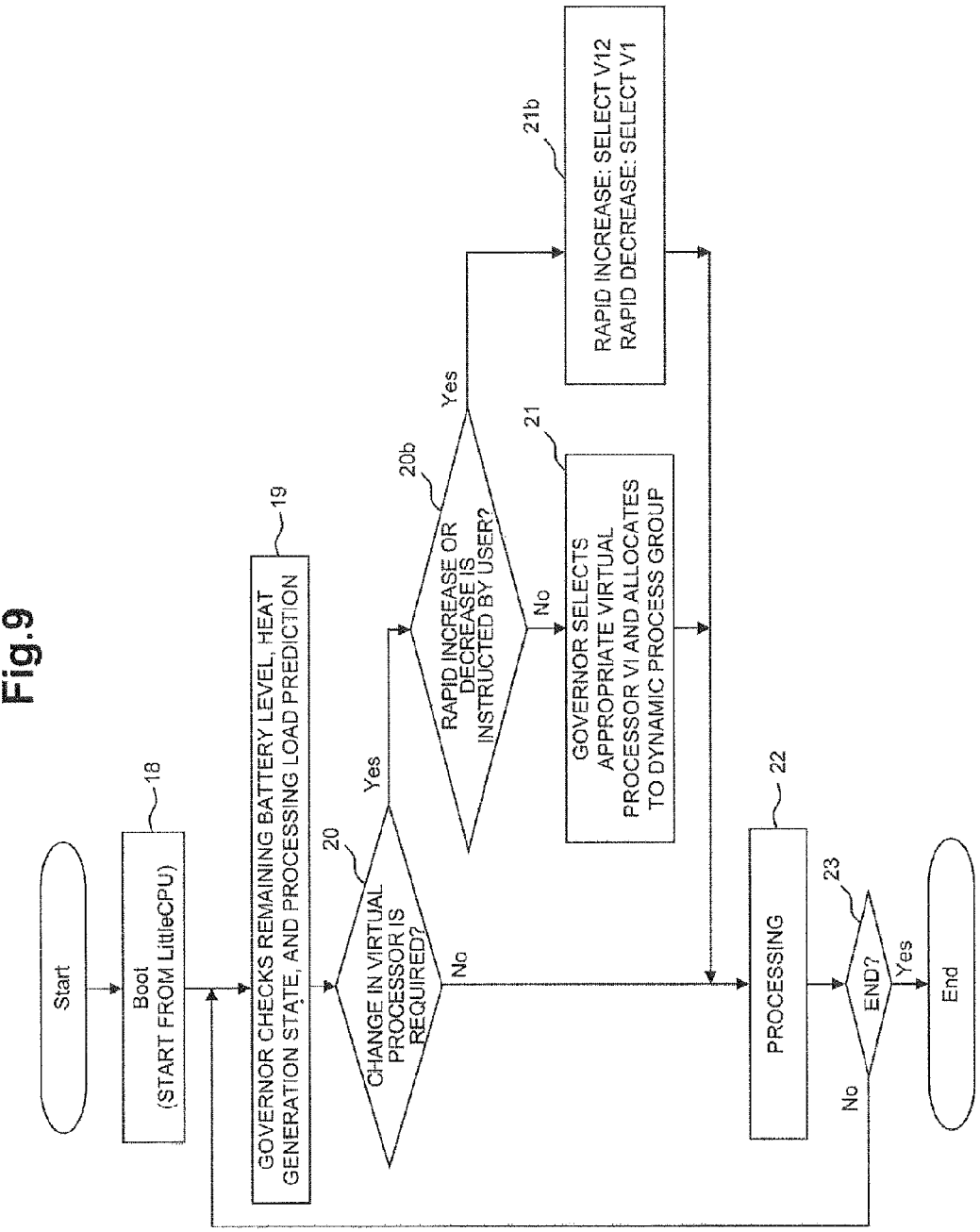
FIG. 9 is a flow chart showing an example of a control of virtual processor allocation in the case in which both gradual update and skip update for the virtual processor can be adopted.

Gradual Update and Skip Update in the Allocation Update of the Virtual Processor Vi FIG. 8 shows the allocation rules of the virtual processor Vi as an example, in which it is assumed that the update of the allocation of the virtual processor Vi is done by gradual update to gradually update the virtual processor Vi step by step. However, the present invention is not limited to this example, and can also adopt skip update for updating the target virtual processor Vi at once by skipping multiple stages. FIG. 9 shows a virtual processor allocation flow in which both the gradual update and skip update of the virtual processor Vi can be adopted. Here is an example of instructions of rapid increase and decrease in the virtual processor selection from the user. When the user starts an application with heavy load, it is necessary to make a rapid increase in the virtual processor selection, and then it is necessary to make a rapid decrease after the completion of the execution of the application with heavy load in order to reduce the unnecessary consumption of the battery power. If a user instruction (User Instruction) 1e shown in FIG. 7 instructs a rapid increase or decrease, it is determined that a change in the virtual processor is necessary (Step 20 in FIG. 9). Then, the determination of whether the factor is either rapid increase or decrease in the instruction is performed in the next Step 20b. If there is the instruction of rapid increase or decrease, the selection of the virtual processor Vi is performed according to the instruction of Step 21b. In this example, V12 with the maximum performance is selected when the instruction is a rapid increase, and V1 with the minimum performance is selected when the instruction is rapid decrease. However, the example does not prevent an arbitrary selection according to each specific request.

CPU Power Supply Control

Figure 10:
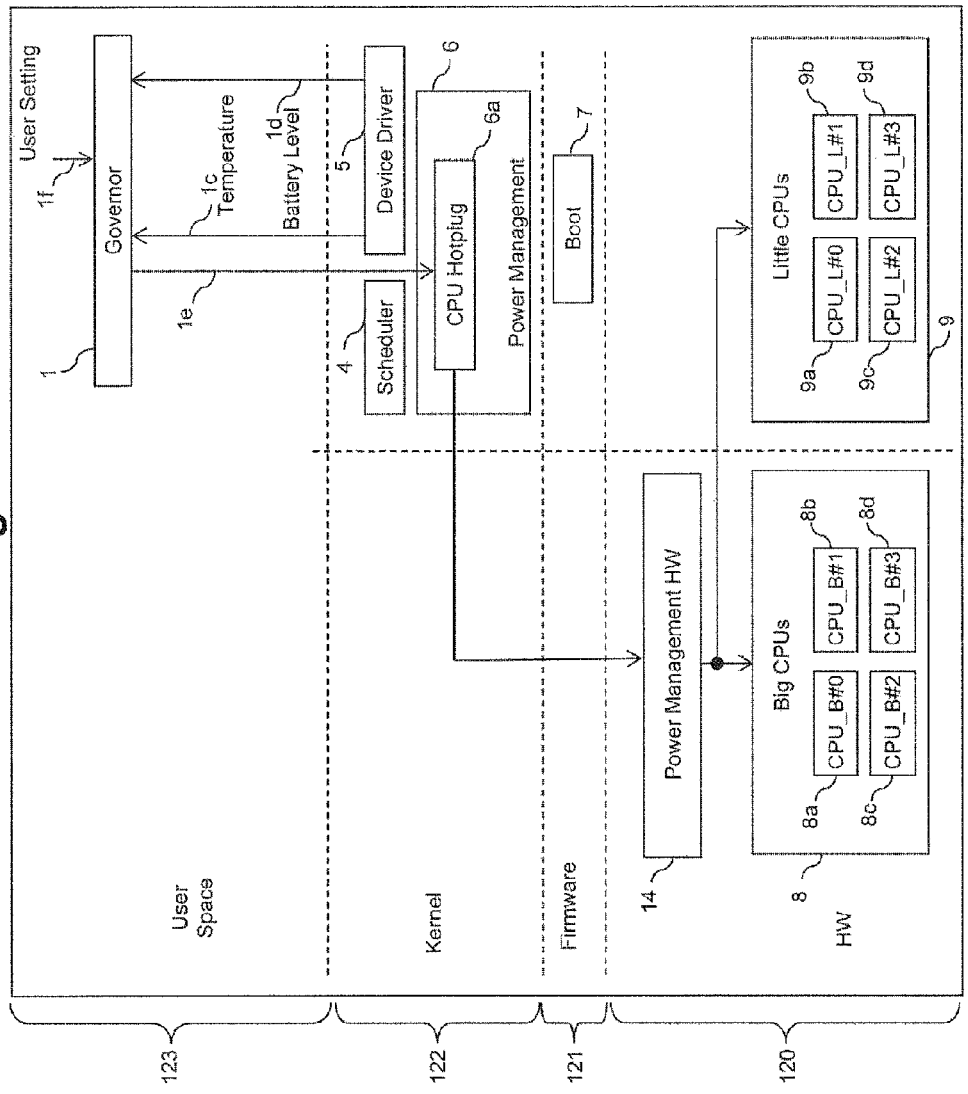
FIG. 10 is a diagram hierarchically showing an example of the configuration of the hardware and software of the processor when the CPU power control is also taken into account.

When the user setting or the policy for a reduction in the remaining battery level is set to Power Save Priority, further reduction in the power consumption can be achieved by further adopting the mechanism for dynamically reducing the power supply of the unused CPU. Further, when the temperature inside the processor 100 is abnormally increased, it is possible to reduce the temperature by turning off all the power supplies associated with the CPUs (Big CPU) 8a to 8d. A specific example of the approach in which such a mechanism is further adopted will be described. FIG. 10 is a diagram hierarchically showing an example of the configuration of the hardware and software of the processor when the CPU power control is also taken into account. Here, the parts not directly related to the description are omitted.

Important components added in FIG. 10 with respect to FIG. 1 are a CPU hot plug (CPUHotplug) 6a and power management hardware (PowerManagement HW) 14. The CPU hot plug (CPUHotplug) 6a is a function of the power management (PowerManagement) 6 of the Linux (registered trademark) kernel (Linux Kernel), in which the power supply of all the mounted CPUs 8a to 8d and 9a to 9d can be turned on or off during the operation by using the power management hardware 14 of the hardware layer 120. Even if another OS is used, the equivalent function can be used. The CPU hot plug 6a has an interface to the user space layer 123. In the example of FIG. 10, it is possible to further enhance the power saving effect described based on FIG. 1, for example, by controlling the interface from the governor (Governor) 1.

Figure 11:
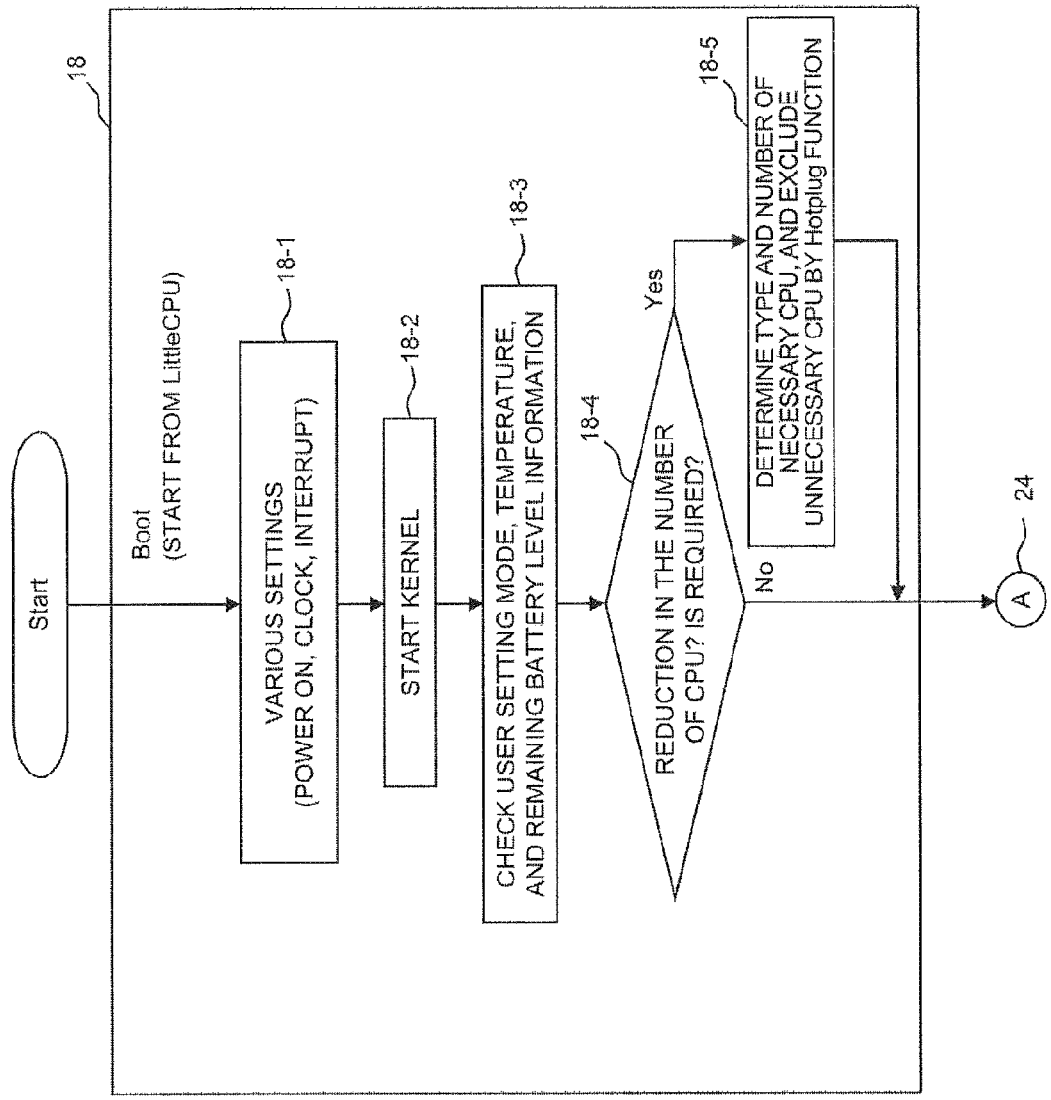
FIG. 11 is a flow chart showing an example of a process flow of the initialization part in the case of adopting the configuration of FIG. 10.

FIG. 11 shows a process flow of the initialization part in the case of adopting the configuration of FIG. 10. The initialization part shown in FIG. 11 can correspond to the boot process (Boot) 18 of FIG. 4 of FIG. 6.

In Step 18-1 of FIG. 11, various settings are performed. For example, power on to all on-chip modules to be used, clock frequency setting, interrupt vector table setting, or other settings are performed. After the various settings are completed, the program of the kernel layer (Kernel) 122 is started (Step 18-2). After the start of the program of the kernel layer 122, the system checks the user setting form, the temperature, and the remaining battery level (Step 18-3) as part of the initialization process, to determine whether or not it is necessary to reduce the number of CPUs to be operated based on the check result (Step 18-4). If reduction is necessary, the system excludes unnecessary CPUs from the use target by using the function of the CPU hot plug 6a (Step 18-5).

FIG. 12 shows an example of the table that defines standards used for the determination when the number of unnecessary CPUs is reduced in steps 18-4 and 18-5. The process (Operation) of reducing the number of CPUs is performed according to the heat generation state (Temperature) 1c, the remaining battery level (Battery Level) 1d, and the user setting (User Setting) 1f. The content of the process (Operation) is only an example for describing the mechanism of the process, and it goes without saying that the content of the process (Operation) can be changed according to the actual system. In the example of FIG. 12, when the temperature is greater than 70 degrees Celsius, the system determines to be an abnormal situation. Then, the system turns on the power supply of only one of the CPUs (LittleCPU) 9a to 9d, regardless of the remaining battery level and the user setting. When the temperature is lower than 70 degrees Celsius, the selection is performed according to the user setting and the battery level, namely, whether the processing capability is emphasized or whether the lower power consumption is prioritized.

In the boot process, the power supply of the used CPU is turned on and the power supply of the unused CPU is turned off according to the user setting or the like. In this way, the operation of the unused CPU can be inactivated from the beginning by the user setting in the system boot. As a result, unnecessary power consumption can be reduced from the beginning. When the unused CPU is not inactivated, the particular CPU will go into a stand-by mode with the power supplied, so that when compared to this case, lower power consumption can be achieved.

Figure 13:
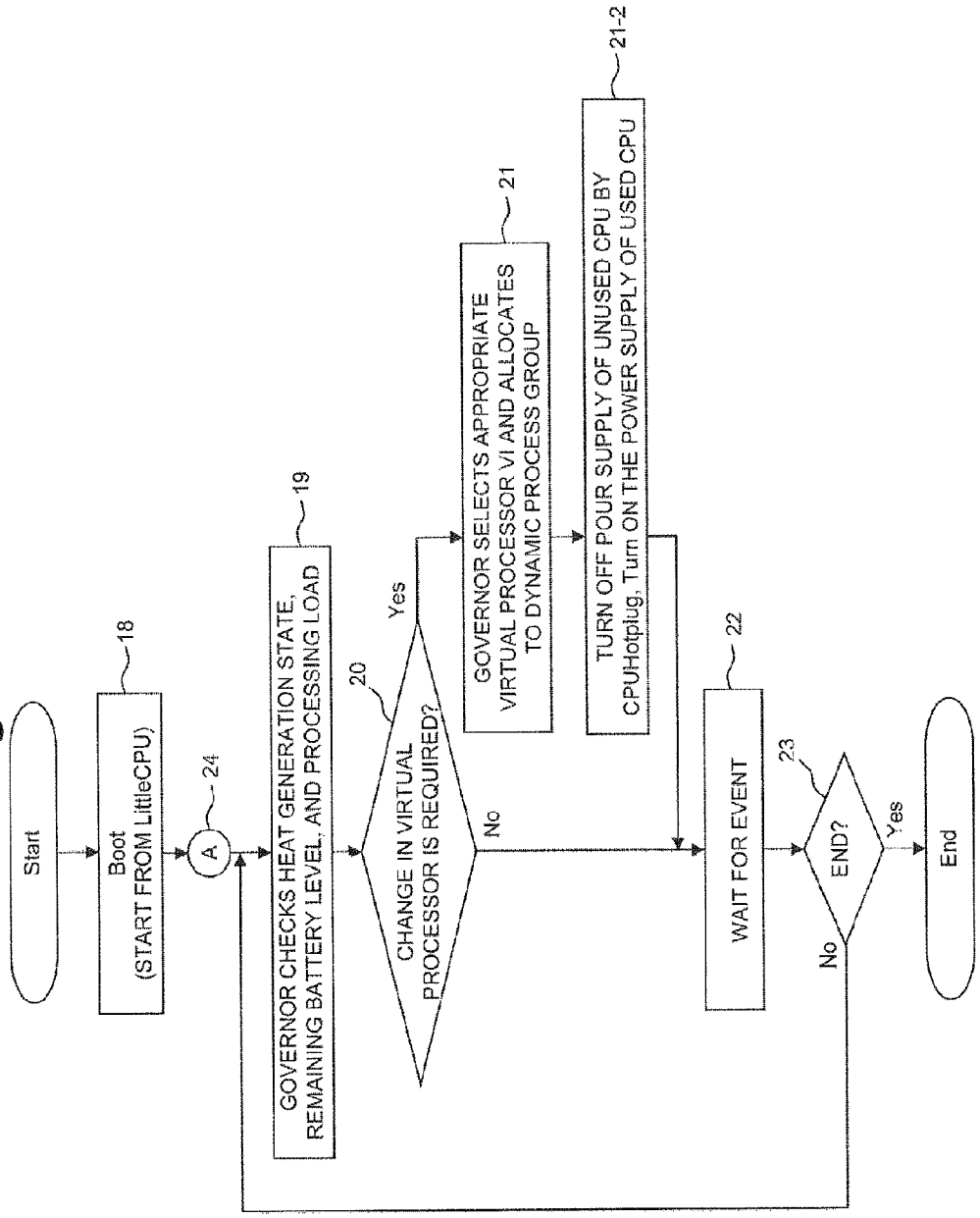
FIG. 13 is a flow chart showing an example of a process flow when the power saving effect is further enhanced by controlling the CPU hot plug from the governor of FIG. 10 also during system operation.

The next describes a mechanism that enables update of the allocation of the type and number of CPUs used for the data processing during the system operation after the initial setting. The power saving effect is further enhanced by controlling the CPU hot plug 6a from the governor (Governor) 1 of FIG. 10 also during the system operation. FIG. 13 shows the process flow.

In FIG. 13, Step 21-2 is added to the flow chart of FIG. 6. After the governor (Governor) 1 selects the appropriate virtual processor Vi and allocates it to the dynamic process group 2, the system dynamically turns off the power supply of the CPU that is not yet used. By tuning off the power supply, unnecessary leakage current does not flow and thus a large save power effect can be obtained. In particular, with respect to the power supply of the CPUs (BigCPU) 8a to 8d with the performance emphasized in which not only the current consumption during the operation but also the leakage current is large, the effect of the ability to turn off the CPU power supply when it is not used is significant.

DVFS Control

Figure 14:
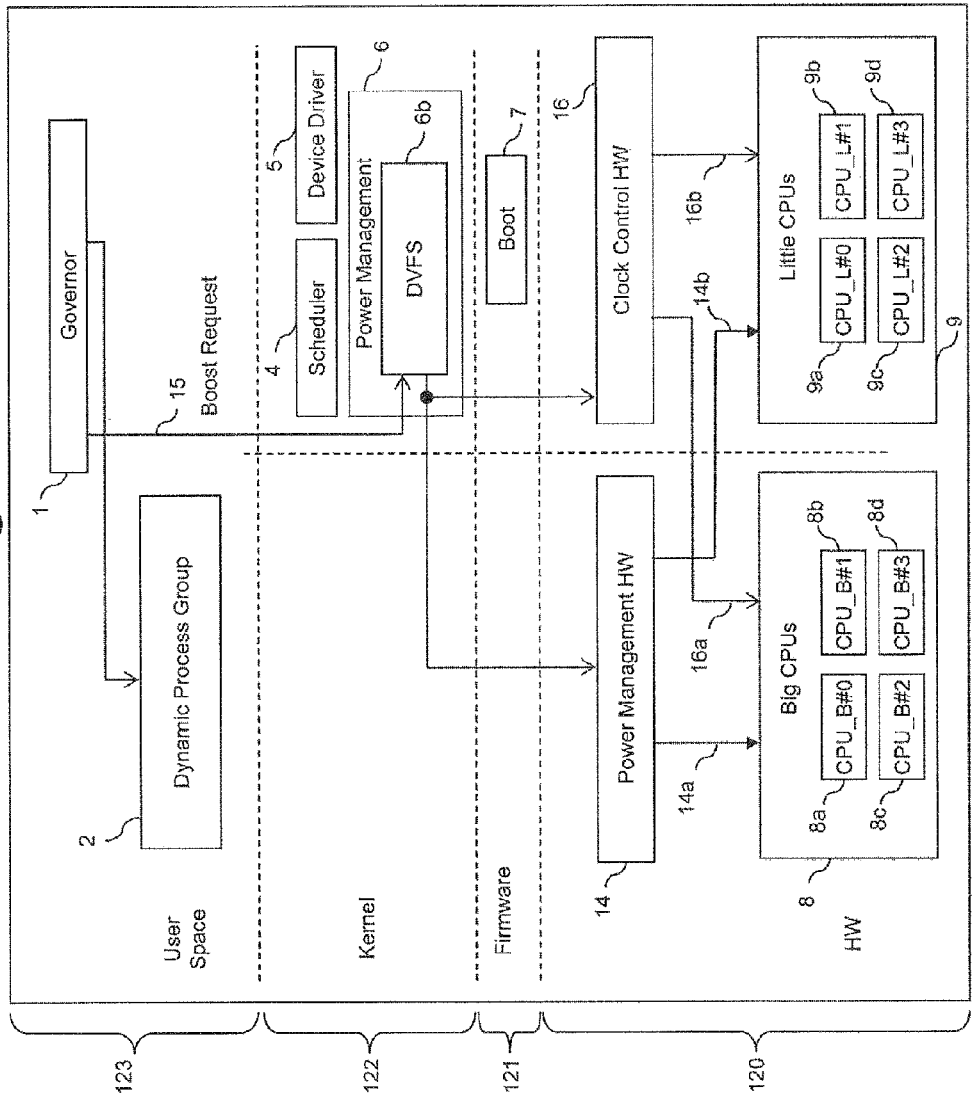
FIG. 14 is a diagram hierarchically showing an example of the configuration of the hardware and software of the processor, in which the DVFS control is further combined with the example of FIG. 10 to enable control to achieve a continuous increase in performance by reducing the power consumption to the minimum level.

If a further performance increase request comes when the CPU allocation to the dynamic process group 2 in which the allocation of the virtual processor Vi is dynamically switched is assigned for all the eight CPUs (Big CPU) 8a to 8d and CPUs (Little CPU) 9a to 9d, the system remains as it is only with the selection forms of FIG. 3, and the performance increase may not be achieved. If the power consumption is allowed to increase, a higher performance can be achieved by increasing both the voltage and frequency of the CPU. This technique is known as the name of DVFS (Dynamic Voltage Frequency Scaling). However, the power consumption is proportional to one power of the frequency and is proportional to the square of the voltage, so that it is necessary to provide extremely fine control in order to reduce the increase in the power consumption to the minimum amount. There is no known implementation method that is effective in asymmetric multi-processor systems. By further combining the DVFS control with the example of FIG. 10 described above, it is possible to provide a control to reduce the power consumption to the minimum amount in order to continuously increase the performance. FIG. 14 is a diagram hierarchically showing an example of the configuration of the hardware and software of the processor 100 to which the DVFS control is further added. Here, the parts not directly related to the description are omitted.

Important components adopted in FIG. 14 are the DVFS 6b, the power management hardware (PowerManagement HW) 14, and the clock control hardware (Clock Control HW) 16. The DVFS 6b is a function of the power management (PowerManagement) 6 of the Linux (registered trademark) kernel (Linux Kernel). The DVFS 6b dynamically controls in conjunction with power supply voltages 14a, 14b and synchronous clocks 16a, 16b of all the mounted CPUs 8a to 8d and 9a to 9d by using the power management hardware (PowerManagement HW) 14 and clock control hardware (Clock Control HW) 16 of the hardware layer 120. The DVFS 6b starts control in response to a boost request (Boost Request) 15 given by the governor 1.

Figure 15:
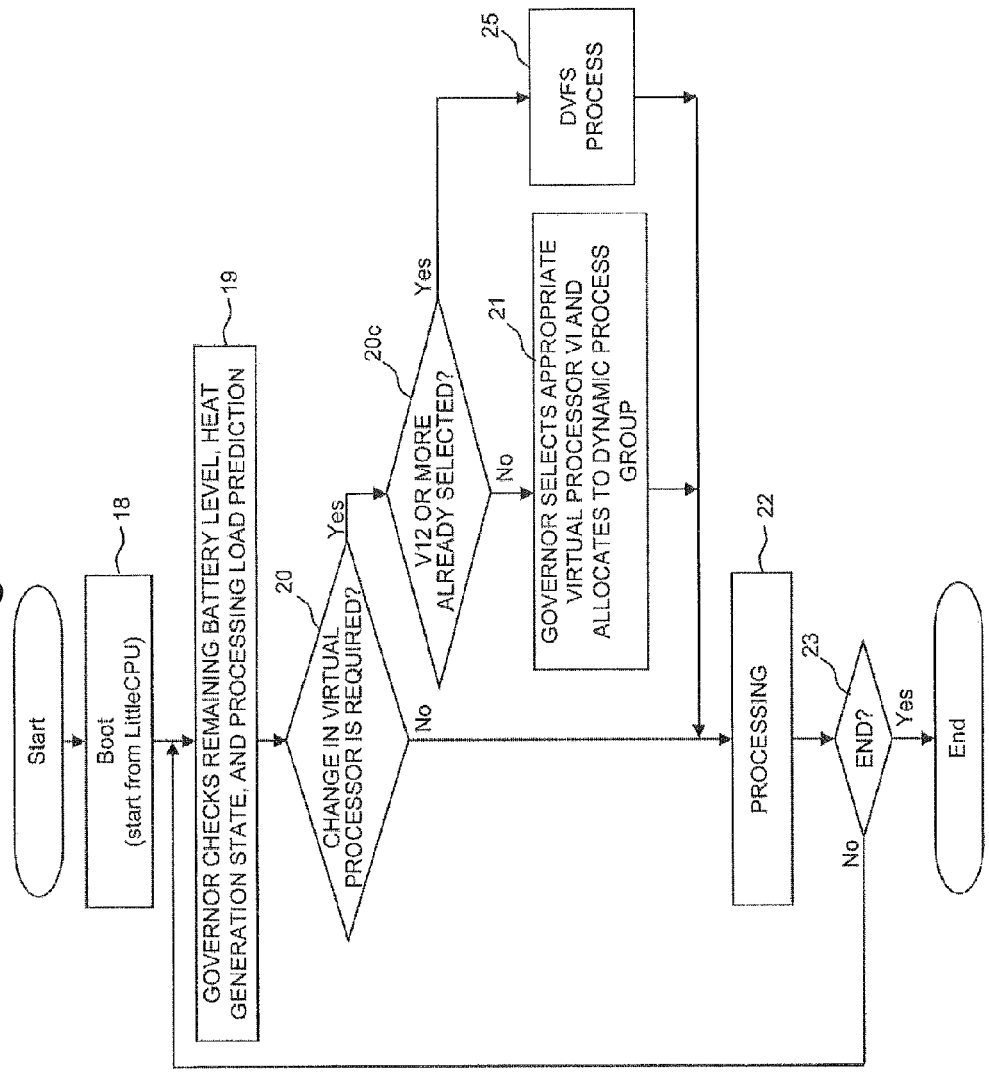
FIG. 15 is a flow chart showing an example of a control flow when the DVFS process is added to FIG. 6.

FIG. 15 shows an example of the control flow in which the DVFS process is added to FIG. 6. As is clear from the figure, when the maximum performance (V12) is selected in which the dynamic process group 2, in which the allocation of the virtual processor Vi can be dynamically switched, uses all the eight CPUs (Big CPU) 8a to 8d and CPUs (Little CPU) 9a to 9d (see Step S20c), the system performs the DVFS process (Step 25) when a further increase performance request comes in this state.

FIG. 16 shows an example of the content of the DVFS process of Step 25. In the example of this specification, it is assumed that the process performance of the CPUs (LittleCPU) 9a to 9d is set to 1 as the reference and the processing performance of the CPUs (BigCPU) 8a to 8d is 2. However, here, it is further assumed that the power supply voltage, which is initially supplied to the CPUs (BigCPU) 8a to 8d and CPUs (LittleCPU) 9a to 9d of both groups 8 and 9, is set to 1 as the reference and the power supply voltage is increased to one point two times the original by the DVFS process of Step 25, to speed up the synchronous clock frequency in conjunction with the increase in the power supply voltage. In this case, the processing performances of the CPUs (BigCPU) 8a to 8d and CPUs (Little CPU) 9a to 9d of both groups 8 and 9 are 1.5 and 3, respectively. However, these assumptions are for explaining this example clearly, and it goes without saying that the content varies according to the actual system.

FIG. 16 shows a plurality of forms of performance increase based on the maximum performance state (the total performance is 12) in the virtual processor V12 before the DVFS process is applied. Based on this, for example, in order to achieve the total performance of 13, the DVFS process is applied to two of the CPUs (LittleCPU) 9a to 9d. The performance of each of the two of the CPUs (LittleCPU) 9a to 9d is increased from 1 to 1.5, so that the total performance is 13 as described in the performance breakdown. This also applies to the case in which the total performance is 14 or more. In the columns of "Big CPU Voltage" and "Little CPU Voltage", the increase in the voltage required for the performance increase is described in such a way that the voltage is also increased according to the performance increase. For example, in order to achieve the total performance of 14, even although it is possible to apply the DVFS process to two of the CPUs (LittleCPU) 9a to 9d and apply to one of the CPUs (BigCPU) 8a to 8d, the power supply voltage of either of the CPU groups is only increased to 1.2 according to the definition of the definition information of FIG. 16 in the DVFS process of Step 25. This is because it is better for low power consumption to increase the power supply voltage for only the low power CPUs (LittleCPU) than to increase the power supply voltage for the CPUs of both groups.

Similarly, when the data processing performance is once increased according to the required performance and then the required performance is reduced, the frequency and the power supply voltage are reduced according to the definition of FIG. 16.

CPU Clock Control for System Load Change that does not Affect the Change in the Virtual Processor In the logic of the virtual processor selection or update shown in FIG. 8, the operation (Operation) of the selection of the virtual processor Vi with respect to the system load change that does not affect the change in the virtual processor is defined as non-operation (NOP). However, the present invention is not limited to this example. As shown in FIG. 17, the scaling of the CPU synchronous clock frequency can also be performed in the range from the range of the processing performance of the selected virtual processor to the extent of not entering the range of the performance of the virtual processor with the next processing performance.

In the foregoing, the invention made by the present inventors has been specifically described based on the embodiments. However, it goes without saying that the present invention is not limited to the foregoing embodiments, and various modifications and alterations can be made within the scope of the present invention.

For example, the type of CPU is not limited to two types of the group of CPUs with high data processing performance and the group of CPUs with low power consumption. There may be three or more types by adding group of CPUs with intermediate data processing capability, or other methods. Further, the number of CPUs belonging to one group is not limited to four. In addition, the number of CPUs belonging to each group is not necessarily the same as the number of CPUs belonging to the other group. In the present specification, the CPU is the same meaning as the processor core. Thus, it goes without saying that the CPU may include not only operation part, instruction control part, and data fetching part but also accelerator hardware such as cache memory, address conversion buffer, RAM, and FPU, or may also include a function of emulating them by software.

Further, a plurality of forms of combination of the types and numbers of CPUs, which are defined by the definition information in such a way that the maximum values of the overall data processing performance and power consumption vary by stages, are not limited to the forms of a plurality of stages of V1 to V12 as shown in FIG. 3. The combination content and the number of stages can be changed accordingly.

Further, the process of allocating the data processing to the CPU, which is identified by the form selected from the definition information according to the data processing environment, is not limited to the method in which the particular CPU acts on the scheduler 4 of the kernel layer 122 by using the governor and the control program of the C group. This can also be achieved by other functions of the kernel layer 122.

The data processing environment is not limited to the data processing load, the heat generation state, the remaining battery level, and the user setting.

Further, in the above description, the factors to understand the situation as the data processing environment are the data processing environment described above are the user setting (1e, 1f), the magnitude of the data processing load (1b), the heat generation state (1c), and the remaining battery level (1d). However, the present invention is not necessarily limited to these examples. Further, these factors can be adopted in such a way that the environment is understood by the magnitude of the data processing load (1b) alone, or by the magnitude of the data processing load (1b) and the heat generation state (1c), or by the magnitude of the data processing load (1b), the heat generation state (1c), and the remaining battery level (1d).

The multi-CPU system can be applied to the SoC (System on a chip) on which the so-called big. LITTLE CPU core is mounted, and to the electronic device (data processing system) using a microcomputer and the like.

INDUSTRIAL APPLICABILITY

The present invention can be widely applied to an asymmetric multi-CPU system on which a plurality of types of CPUs with different data processing performance and power consumption are mounted in groups for each type, as well as a multi-CPU system scaling method for scaling the combination of the type and number of CPUs to be used according to the data processing environment in such a system. Further, the present invention can also be applied to battery-driven portable information terminal devices represented by smartphones, and the like.

EXPLANATION OF REFERENCE NUMERALS 1 governor (Governor)
1a control signal according to the required process performance
1b processing load (CPU Load)
1c heat generation state (Temperature)
1d remaining battery level (Battery Level)
1e user instruction (User Instruction)
1f user setting (User Setting)
2 dynamic process group (Dynamic Process Group)
3 slow process group (Slow Process Group)
4 scheduler (Scheduler)
5 device driver (Device Driver)
6 power management (Power Management)
6a CPU hot plug (CPUHotplug)
6b DVFS
7 boot code (Boot)
8 first group of CPUs with high data processing performance and large power consumption (BigCPUs)

8a-8d CPUs of first group 8 (CPU_B#0 to CPU_B#3)
9 second group of CPUs with low power consumption and low data processing performance (LittleCPUs)
8a-8d CPUs of second group 8 (CPU_L#0 to CPU_L#3)
Vi virtual processor
14 power management hardware (Power Management HW)
14a, 14b power supply voltage
15 boost request (Boost Request)
16 clock control hardware (Clock Control HW)
16a, 16b synchronous clock
100 processor
101 peripheral devices
102 bus (or network)
110 bus
111 memory
112 input/output interface circuit
113 peripheral modules
120 hardware layer (HW)
121 firmware layer (Firmware)
122 kernel layer (Kernel)
123 user space layer (User space)

What is claimed is:

1. An asymmetric multi-CPU (Central Processing Unit) system, comprising:
a plurality of types of CPUs with different data processing performance and power consumption are mounted in groups for each type;
a non-transitory computer readable medium storing definition information including allocation rules that defines a plurality of forms of combination of the types and numbers of the CPUs in such a way that maximum values of overall data processing performance and power consumption of the combination of the types and numbers of the CPUs vary by stages for the plurality of forms of combination, to allocate data processing to a CPU from among the plurality of types of CPUs identified by a form from among the plurality of forms selected from the definition information according to an environment of the allocated data processing;
a plurality of virtual processors are generated according to the definition information from the combination of types and number of CPUs according to the varying stages of the overall data processing performance and power consumption,
wherein an operation of the selection of a virtual processor from among the plurality of virtual processors with respect to a system load change includes a scaling of a CPU synchronous clock frequency being performed in a range from a first range of a processing performance of a selected virtual processor to an extent of not entering a second range of the performance of the virtual processor with the next processing performance.

2. The multi-CPU system according to claim 1,
wherein a plurality of forms of combination of the types and numbers of CPUs included in the definition information are the forms of combination of the types and numbers of CPUs in a direction in which the data processing performance and the power consumption are increased by stages.

3. The multi-CPU system according to claim 2,
wherein the data processing environment comprises:
a first environment that is understood by a magnitude of the data processing load;
a second environment that is understood by the magnitude of a data processing load and by a heat generation state;
a third environment that is understood by the magnitude of the data processing load, the heat generation state, and a remaining battery level; or
a fourth environment that is understood by the user setting, the magnitude of the data processing load, the heat generation state, and the remaining battery level.

4. The multi-CPU system according to claim 3,
wherein the heat generation state is the heat generation state of a CPU included in a group of the CPUs with a greater data processing performance and power consumption than a data processing performance and power consumption of another group of CPUs.

5. The multi-CPU system according to claim 1,
wherein a plurality of forms of combination of the types and numbers of CPUs included in the definition information are the forms of combination of the types and numbers of CPUs in the direction that meets a required processing performance by stages according to the data processing environment, and
wherein the system selects the form of a minimum performance that meets the required processing performance.

6. The multi-CPU system according to claim 5,
wherein, upon a boot process, the certain CPU selects one of the forms from the definition information according to at least a user setting as the data processing environment, thus activating a CPU from among the plurality of CPUs to be used for data processing according to the selected form and inactivating an unused CPU from among the plurality of CPUs.

7. The multi-CPU system according to claim 6,
wherein upon update of an allocation of the type and number of CPUs to be used in data processing, when an inactive CPU is allocated as a use target, the system activates a particular CPU from among the plurality of CPUs, while when an active CPU is excluded from the use target, the system inactivates the particular CPU.

8. The multi-CPU system according to claim 6,
wherein the update of the allocation of the type and number of CPUs to be allocated to the data processing is done by gradual update to gradually update a form to be selected step by step, or by skip update to update the form to be selected at once by skipping multiple stages,
wherein when the change in the data processing environment is within a predetermined range, the gradual update is used, and
wherein when the change in the data processing environment is beyond the predetermined range, the skip update is used.

9. The multi-CPU system according to claim 6,
wherein the inactivation of a CPU is synchronous clock supply stop or/and power supply stop to a particular CPU from among the plurality of CPUs, and the activation is synchronous clock supply start or/and power supply start to the particular CPU.

10. The multi-CPU system according to claim 1,
wherein a CPU type corresponds to a plurality of groups of CPUs that are classified according to a magnitude of the data processing performance and power consumption of the CPU.

11. The multi-CPU system according to claim 1,
wherein a number of plurality of forms of combination of the types and numbers of CPUs is greater than a number of mounted CPUs.

12. The multi-CPU system according to claim 1,
wherein a control of a type and a number of CPUs to be allocated to the data processing is a process of notifying a kernel of the type and the number of CPUs that can be used for data processing, by a control program of a user space.

13. The multi-CPU system according to claim 12, wherein the process of notifying by the control program is achieved by a kernel function that controls a scheduler of the kernel from the user space.

14. The multi-CPU system according to claim 13, wherein the CPU that executes the control program is a certain CPU of a CPU group with a lower data processing performance and power consumption than a data processing performance and power consumption of another CPU group.

15. The multi-CPU system according to claim 1, wherein when there is a performance request beyond a maximum performance that is defined in the definition information as the data processing environment, a DVFS (Dynamic Voltage/Frequency Scaling) process is performed to raise either or both of the power supply voltage of a certain CPU and the synchronous clock frequency thereof, according to a level of the request.

16. The multi-CPU system according to claim 15, wherein the system comprises DVFS definition information that defines a CPU subject to the DVFS process, as well as a degree of rise of a power supply voltage and synchronous clock frequency for the particular CPU, according to a level of the performance request, to perform the DVFS process by referring to a particular definition information.

17. The multi-CPU system according to claim 1, wherein a virtual processor from among the plurality of virtual processors is selected according to the environment of the data processing,
wherein the maximum values of overall data processing performance and power consumption for each combination of the number and types of CPUs are different for at least three stages of the plurality of forms of combination, and
wherein the form from among the plurality of forms is selected through the definition information and void of a scheduler.

18. The multi-CPU system according to claim 1, wherein an operation of a selection of a virtual processor from among the plurality of virtual processors being independent of a CPU clock control for system load change is defined as non-operation.

19. A multi-CPU (Central Processing Unit) system scaling method for scaling combination of the type and number of CPUs to be used according to a data processing environment, in an asymmetric multi-CPU system on which a plurality of types of CPUs with different data processing performance and power consumption are mounted in groups for each type, wherein the multi-CPU system scaling method comprises:
a determination process for determining the data processing environment;
a selection process for selecting one form from definition information including allocation rules that defines a plurality of forms of combination of types and numbers of CPUs from among the plurality of CPUs in such a way that maximum values of overall data processing performance and power consumption of the combination of the types and numbers of the CPUs vary by stages for the plurality of forms of combination, based on the data processing environment determined in the determination process; and
a control process for allocating the data processing to a CPU from among the plurality of CPUs identified by the selected form,
wherein a plurality of virtual processors are generated according to the definition information from the combination of types and number of CPUs according to the varying stages of the overall data processing performance and power consumption, and
wherein an operation of the selection of a virtual processor from among the plurality of virtual processors with respect to a system load change includes a scaling of a CPU synchronous clock frequency being performed in a range from a first range of a processing performance of a selected virtual processor to an extent of not entering a second range of the performance of the virtual processor with the next processing performance.

20. The multi-CPU system scaling method according to claim 19,
wherein a plurality of forms of combination of the types and numbers of CPUs included in the definition information are the forms of combination of the types and numbers of CPUs in the direction in which the data processing performance and the power consumption are increased by stages.

21. The multi-CPU system scaling method according to claim 20,
wherein the data processing environment comprises:
a first environment that is understood by a magnitude of a data processing load;
a second environment that is understood by the magnitude of the data processing load and a heat generation state;
a third environment that is understood by the magnitude of the data processing load, the heat generation state, and a remaining battery level; or
a fourth environment that is understood by the user setting, the magnitude of the data processing load, the heat generation state, and the remaining battery level.

22. The multi-CPU system scaling method according to claim 19,
wherein a plurality of forms of combination of the types and numbers of CPUs included in the definition information are the forms of combination of the types and numbers of CPUs in a direction that meets a required processing performance by stages according to the data processing environment, and
wherein the system selects the form of a minimum performance that meets the required processing performance.

23. The multi-CPU system scaling method according to claim 22,
wherein the data processing environment comprises:
a first environment that is understood by a magnitude of a data processing load;
a second environment that is understood by the magnitude of the data processing load and a heat generation state;
a third environment that is understood by the magnitude of the data processing load, the heat generation state, and a remaining battery level; or
a fourth environment that is understood by the user setting, the magnitude of the data processing load, the heat generation state, and the remaining battery level.

* * * * *